United States Patent
Harada

(10) Patent No.: US 10,254,168 B2
(45) Date of Patent: Apr. 9, 2019

(54) COLORIMETER DEVICE AND COLORIMETERY METHOD

(71) Applicant: KONICA MINOLTA INC., Chiyoda-ku (JP)

(72) Inventor: Koji Harada, Sakai (JP)

(73) Assignee: KONICA MINOLTA, INC., Tokyo (JP)

(*) Notice: Subject to any disclaimer, the term of this patent is extended or adjusted under 35 U.S.C. 154(b) by 141 days.

(21) Appl. No.: 15/526,196

(22) PCT Filed: Nov. 4, 2015

(86) PCT No.: PCT/JP2015/080992
§ 371 (c)(1),
(2) Date: May 11, 2017

(87) PCT Pub. No.: WO2016/076163
PCT Pub. Date: May 19, 2016

(65) Prior Publication Data
US 2017/0314993 A1 Nov. 2, 2017

(30) Foreign Application Priority Data

Nov. 14, 2014 (JP) ................................ 2014-231554

(51) Int. Cl.
*G01J 3/52* (2006.01)
*H04N 1/00* (2006.01)
(Continued)

(52) U.S. Cl.
CPC ............ *G01J 3/52* (2013.01); *H04N 1/00023* (2013.01); *H04N 1/00039* (2013.01); *H04N 1/00045* (2013.01); *H04N 1/00082* (2013.01); *H04N 1/4076* (2013.01); *H04N 1/6005* (2013.01); *B65H 3/06* (2013.01); *B65H 5/062* (2013.01); *H04N 2201/0005* (2013.01); *H04N 2201/0094* (2013.01)

(58) Field of Classification Search
CPC ............................... G01J 3/52; H01N 1/00045
USPC ........................................................ 356/421
See application file for complete search history.

(56) References Cited

U.S. PATENT DOCUMENTS 6,765,674 B2 7/2004 Orelli et al.
2007/0291291 A1* 12/2007 Vilar .................... H04N 1/3878
358/1.9
(Continued)

FOREIGN PATENT DOCUMENTS

JP 10-13702 1/1998
JP 11-288465 10/1999
(Continued)

*Primary Examiner* — Thanh Luu
(74) *Attorney, Agent, or Firm* — Cozen O'Connor

(57) ABSTRACT

A colorimetric device and a colorimetric method according to the present invention extract a chart region candidate, which is a candidate for a chart region, from an image of a color chart, obtain an evaluation value of this chart region candidate, determine whether or not the chart region candidate is the chart region based on this obtained evaluation value, obtain each position of a plurality of patches for the chart region candidate determined as the chart region as a result of the determination and colorimetrically measure each of the patches at each obtained position of the plurality of the patches.

13 Claims, 13 Drawing Sheets

(51) Int. Cl.
  *H04N 1/60* (2006.01)
  *H04N 1/407* (2006.01)
  *B65H 3/06* (2006.01)
  *B65H 5/06* (2006.01)

(56) References Cited

U.S. PATENT DOCUMENTS

2008/0007802 A1   1/2008   Viturro et al.
2015/0009226 A1   1/2015   Minagawa et al.

FOREIGN PATENT DOCUMENTS

| JP | 2000-253262 | 9/2000 |
| JP | 2007-172608 | 7/2007 |
| JP | 2007-259203 | 10/2007 |
| JP | 2013-113591 | 6/2013 |
| WO | WO 2013/145295 | 10/2013 |

* cited by examiner

MAIN SCANNING DIRECTION
(MOVING DIRECTION OF
COLORIMETRIC UNIT) X

SUB-SCANNING DIRECTION
(PAPER CONVEYING DIRECTION) Y

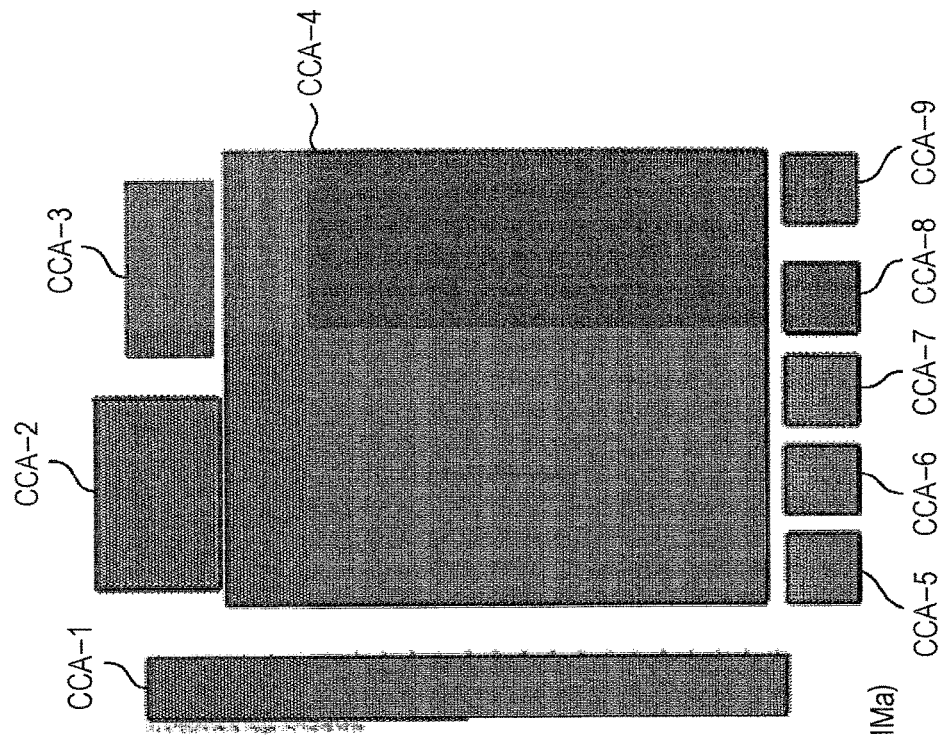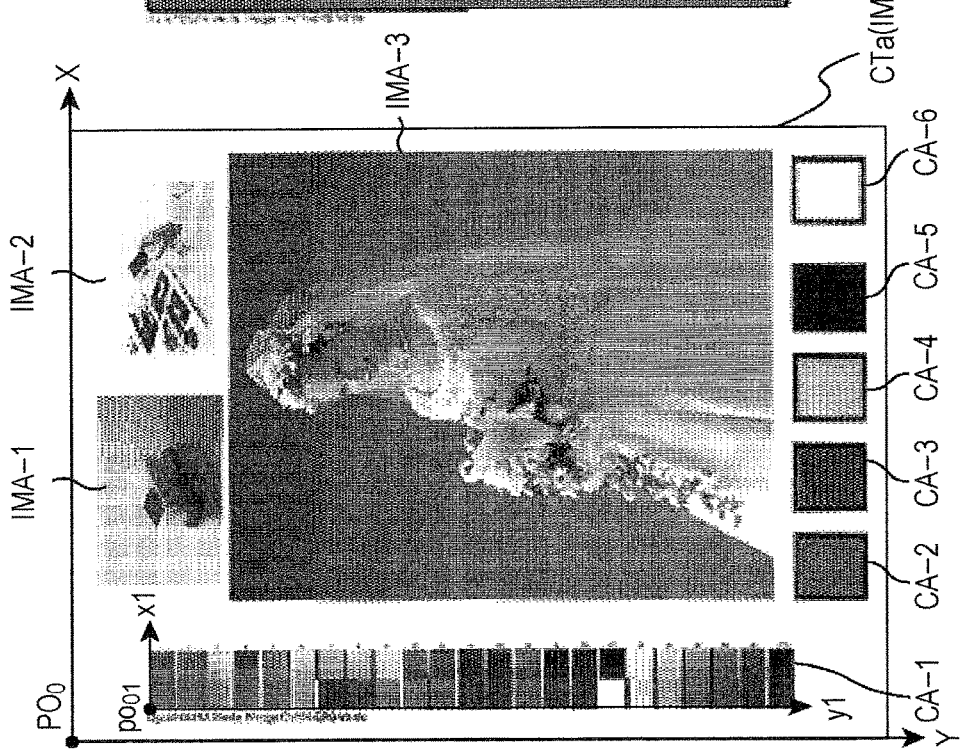

EDGE LINE (—), INTERMEDIATE LINE (···) AND PATCH CENTRAL POSITION (O)

COLORIMETER DEVICE AND COLORIMETERY METHOD

RELATED APPLICATIONS

This is a U.S. National Phase Application under 35 USC 371 of International Application PCT/JP2015/080992 filed on Nov. 4, 2015.

This application claims the priority of Japanese application no. 2014-231554 filed Nov. 14, 2014 the entire content of which is hereby incorporated by reference.

TECHNICAL FIELD

The present invention relates to a colorimetric device and colorimetric method of measuring color and, particularly, to a colorimetric device and colorimetric method capable of appropriately determining a chart region and automatically performing colorimetry at an appropriate position.

BACKGROUND ART

For example, a company which produces color printed matter, such as a printing company, periodically measures the colors of the printed matter and adjusts the colors of a printing device which has printed the printed matter to maintain the quality of the printed matter. For this color adjustment of the printing device, for example, original image data called a color chart is printed by the printing device, and each color of each patch in this printed color chart is measured by a colorimetric device. Then, a color shift amount between the measured value of the color of each patch and the target value of the color of each patch is evaluated, and the colors of the printing device are adjusted according to this evaluation result.

The color chart is configured by including a plurality of color samples called the patches, and each of the plurality of the patches is often formed with a different color (hue, brightness, chroma) from each other and arrayed in a predetermined manner. There are various kinds of such a color chart. For example, there is a color chart of an aspect configured by arranging a plurality of quadrangular patches having various colors vertically and horizontally in a two-dimensional array. The color chart of this aspect further has various patterns including that each patch is arrayed so as to be in a random (random) color array depending on the contents to be evaluated and that each patch is arrayed so as to reduce changes in contrasting densities of patches adjacent to each other, like gradations. Accordingly, such a color chart is not only created by a user by using a color chart creating tool provided by a manufacturer of a colorimetric device, but also provided by a public institution. Thus, the color chart has quite various patterns due to differences in the shapes, arrangements, colorations and the like of the patches.

On the other hand, the number of colors used for the color adjustment of a printing device has been increasing year by year. Accordingly, the number of patches arranged in a color chart has also been increasing. Moreover, the size (area) of each patch is small.

Under these circumstances, it is becoming practically impossible to manually accurately align a measurement part of a colorimetric device with each patch to perform colorimetry. For this reason, an automatic system is desired to automatically measure a position of each patch and automatically align a measurement part of a colorimetric device with this measured position of each patch to measure the color of each patch. As one example of this system, Gretag-Macbeth AG has proposed, in the Patent Literature 1, a method of colorimetrically measuring a color chart by capturing a two-dimensional color image of a color chart desired to be measured, calculating a position of a patch with an image processing technique using a computer, and moving a colorimetric head to the determined position of the patch.

Incidentally, as described above, there are various kinds of color charts. One of the color charts includes not only a chart region where a plurality of patches exist, but also a normal image region where a normal image, in which, for example, a landscape, animals, plants, people, goods, characters (symbols) and the like are imaged, exists. Since the automatic patch position measuring method of automatically measuring the position of the patch disclosed in the Patent Literature 1 does not determine whether or not the patch belongs to the chart region, the method also measures the position of the patch in such a normal image region as a measurement subject when the method measures the color chart including the normal image region. Thus, the automatic patch position measuring method disclosed in the Patent Literature 1 may erroneously detect the position of the patch.

CITATION LIST

Patent Literature

Patent Literature 1: U.S. Pat. No. 6,765,674

SUMMARY OF INVENTION

The present invention has been made in light of the aforementioned circumstances, and an object thereof is to provide a colorimetric device and colorimetric method capable of appropriately determining a chart region and automatically performing colorimetry at an appropriate position.

The colorimetric device and colorimetric method according to the present invention extract a chart region candidate, which is a candidate for a chart region, from an image of a color chart, obtain an evaluation value of this chart region candidate, determine whether or not the chart region candidate is the chart region based on this obtained evaluation value, obtain each position of a plurality of patches for the chart region candidate determined as the chart region as a result of the determination and colorimetrically measure each of the patches at each obtained position of the plurality of the patches. Therefore, the colorimetric device and colorimetric method according to the present invention can appropriately determine the chart region and automatically perform colorimetry at an appropriate position.

The aforementioned and other objects, features and advantages of the present invention will be apparent from the following detailed description and the accompanying drawings.

BRIEF DESCRIPTION OF DRAWINGS

FIG. 8 is a view for explaining the operations of the chart region candidate extraction processing unit in the colorimetric device of the embodiment.

DESCRIPTION OF EMBODIMENTS

Figure 1:
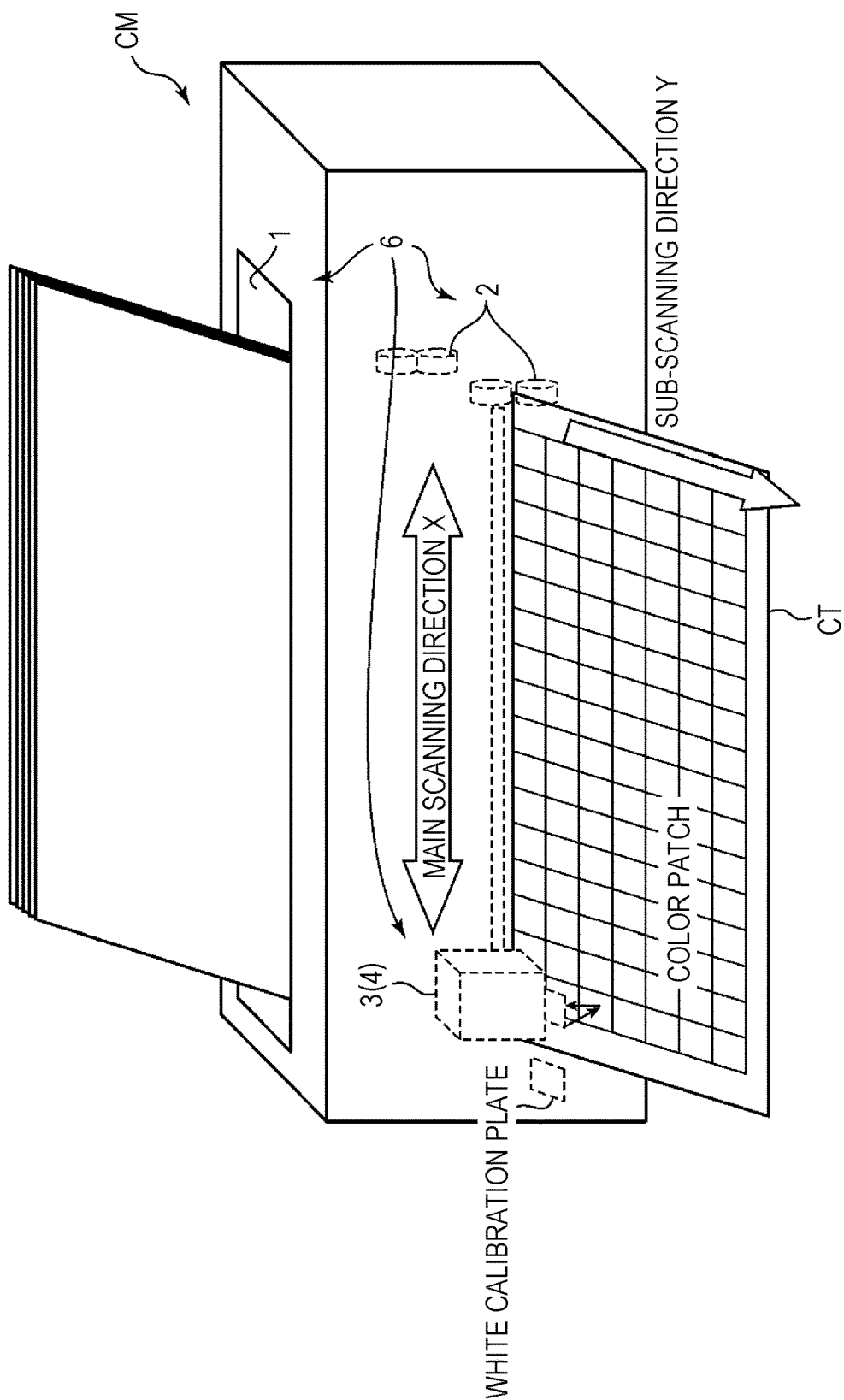
FIG. 1 is a perspective view showing a schematic configuration of a colorimetric device in an embodiment.

Hereinafter, one embodiment of the present invention will be described based on the drawings. Note that elements with the same signs are the same elements in the drawings, and descriptions thereof are omitted as appropriate. In the specification, a reference sign without a suffix indicates a collective element, and a reference sign with a suffix indicates an individual element.

Figure 2:
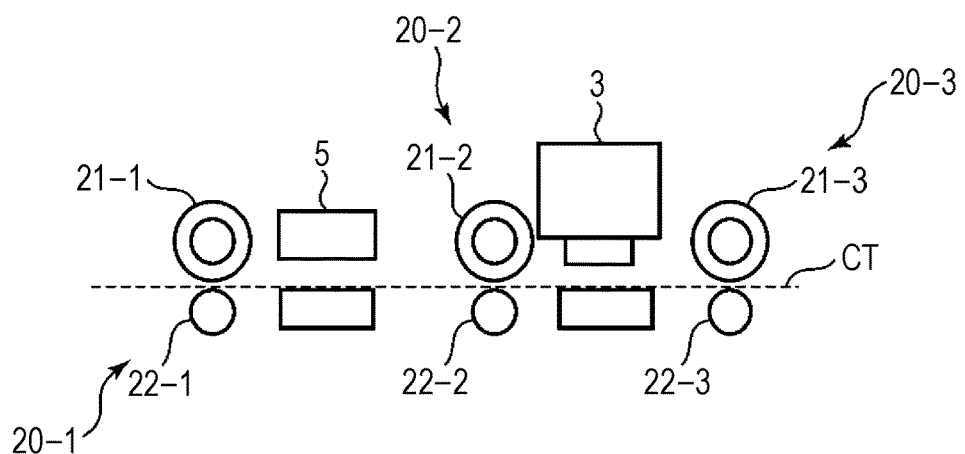
FIG. 2 is a schematic side view showing an arrangement relationship between an imaging unit and a colorimetric unit in the colorimetric device of the embodiment.
Figure 3:
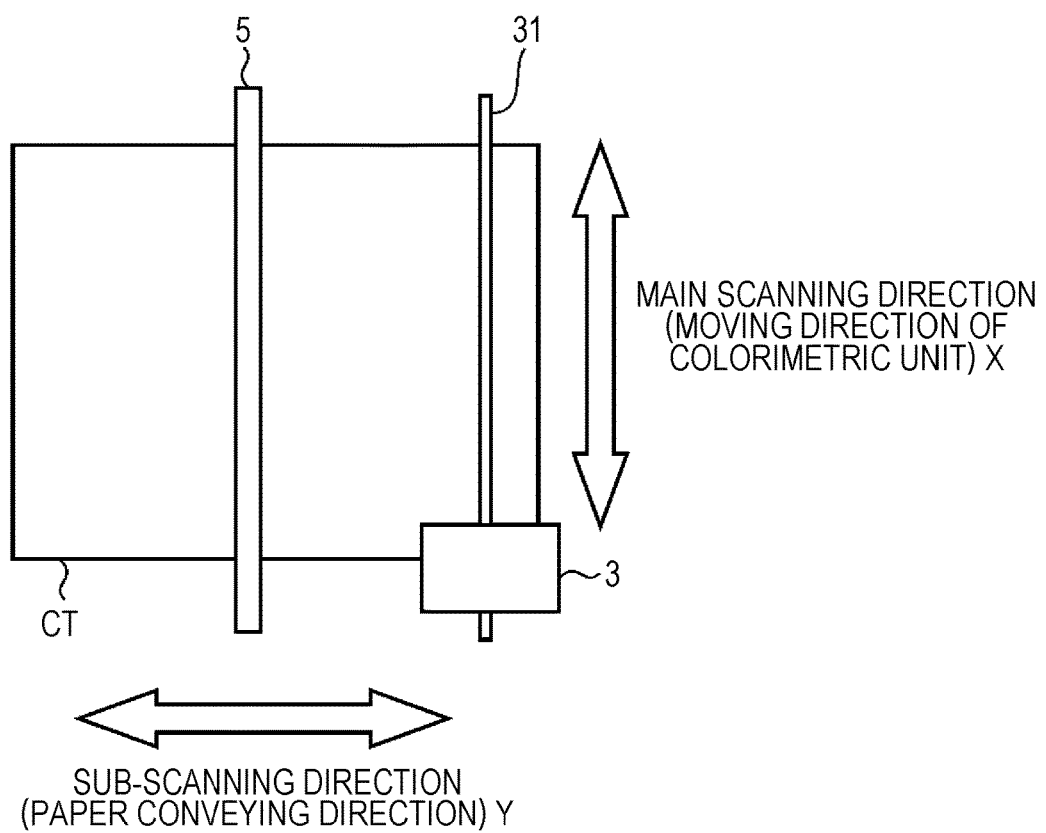
FIG. 3 is a schematic top view showing an arrangement relationship between the imaging unit and the colorimetric unit in the colorimetric device of the embodiment.
Figure 4:
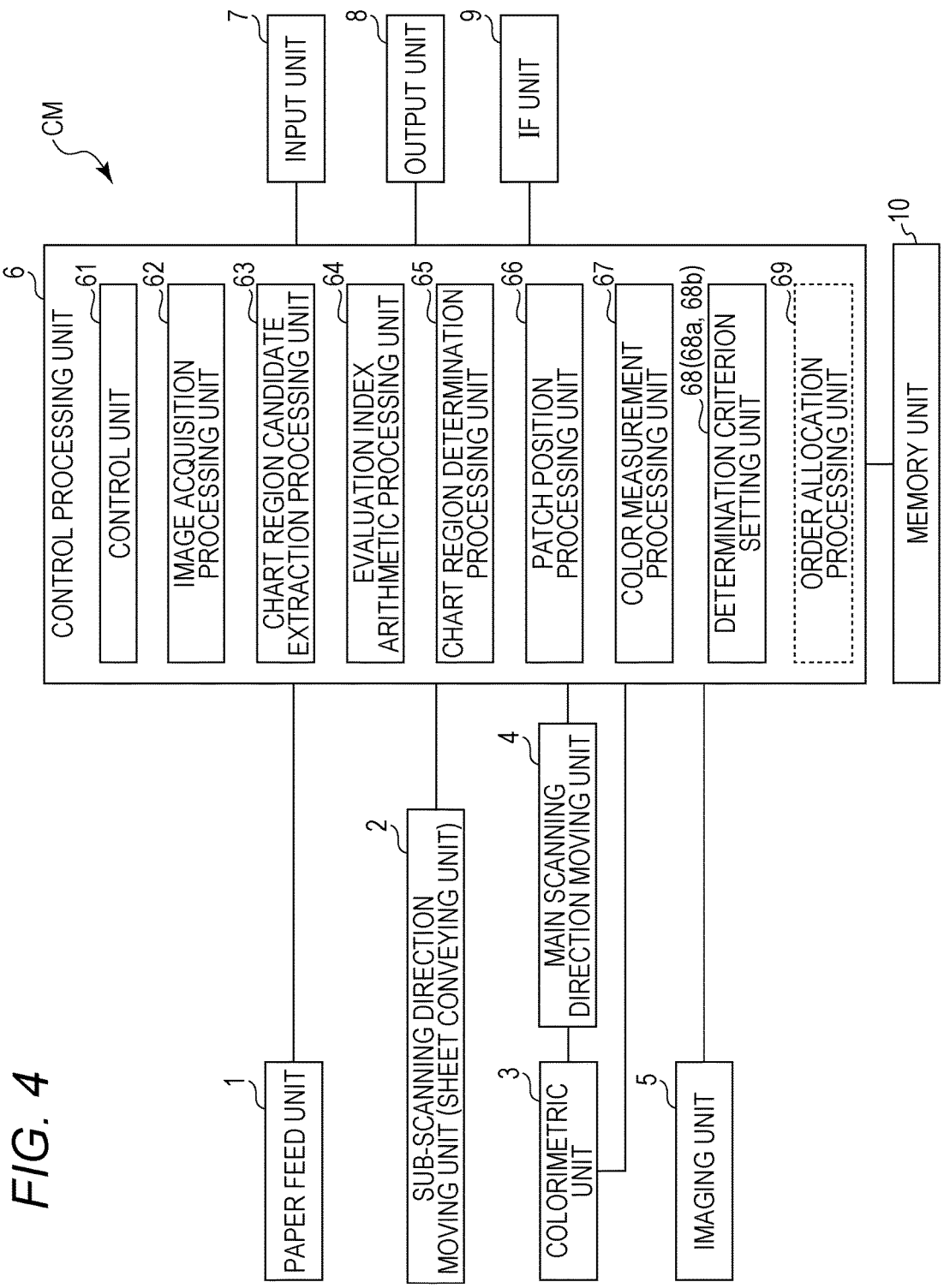
FIG. 4 is a block diagram showing an electric configuration of the colorimetric device in the embodiment.
Figure 5:
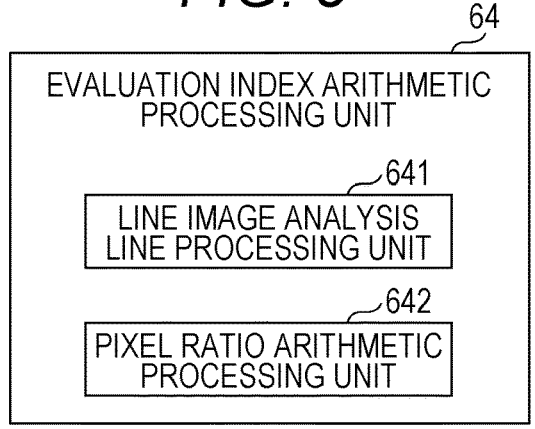
FIG. 5 is a block diagram showing a configuration of an evaluation index arithmetic processing unit in the colorimetric device of the embodiment.

FIG. 1 is a perspective view showing a schematic configuration of a colorimetric device in an embodiment. FIG. 2 is a schematic side view showing an arrangement relationship between an imaging unit and a colorimetric unit in the colorimetric device of the embodiment. FIG. 3 is a schematic top view showing an arrangement relationship between the imaging unit and the colorimetric unit in the colorimetric device of the embodiment. FIG. 4 is a block diagram showing an electric configuration of the colorimetric device in the embodiment. FIG. 5 is a block diagram showing a configuration of an evaluation index arithmetic processing unit in the colorimetric device of the embodiment.

A colorimetric device CM in the present embodiment is a device for measuring the color (hue, brightness, chroma) of a target measurement object which is a colorimetric subject. For example, as shown in FIGS. 1 to 5, the colorimetric device CM includes a paper feed unit 1, a sub-scanning direction moving unit (sheet conveying unit) 2, a colorimetric unit 3, a main scanning direction moving unit 4, an imaging unit 5, a control processing unit 6, an input unit 7, an output unit 8, an interface unit (IF unit) 9 and a memory unit 10.

The paper feed unit 1 is a sheet conveying mechanism which is connected to the control processing unit 6 and takes a sheet of the target measurement object set in the colorimetric device CM into the colorimetric device CM according to the control of the control processing unit 6. The sheet of the target measurement object may be arbitrary. However, for example, in a case of adjusting the colors of a printing device, the sheet is a color chart CT including a plurality of patches, which are regions of predetermined colors, on predetermined paper. The paper feed unit 1 includes, for example, a storage unit for storing a sheet of the target measurement object, an intake unit configured by including, for example, pickup rollers and the like for picking up the sheet of the target measurement object stored in the storage unit and taking the sheet into the colorimetric device CM, and an infeed unit configured by including, for example, conveying rollers and the like for conveying the sheet of the target measurement object taken in by the intake unit to the sub-scanning direction moving unit 2.

The sub-scanning direction moving unit (sheet conveying unit) 2 is a sheet conveying mechanism which is connected to the control processing unit 6 and conveys the sheet of the target measurement object, which is fed from the paper feed unit 1, in a sub-scanning direction (second direction), which is orthogonal to a first direction preset as a main scanning direction, by each predetermined amount by a unit conveying command (second unit conveying command) according to the control of the control processing unit 6. The sub-scanning direction moving unit 2 is configured so as to be able to perform the conveyance by forward feed and reverse feed along the sub-scanning direction. The forward feed means, for example, to convey the sheet of the target measurement object from the upstream side (paper feed unit 1 side) to the downstream side (discharge side), and the reverse feed means to convey the sheet of the target measurement object in a direction reverse to the direction of the forward feed, that is, from the downstream side to the upstream side. The sub-scanning direction moving unit 2 is configured by including, for example, a plurality of sets of sheet conveying roller units, driving units for rotationally driving the sheet conveying rollers, and the like. Each of the sets of the sheet conveying roller units is configured by including a driving roller rotationally driven by the driving unit, a driven roller rotationally driven according to the rotational driving of the driving roller, and the like. The driving unit is configured by including, for example, stepping motors (sub-scanning stepping motor). In the sub-scanning direction moving unit 2 with such a configuration, by inputting one pulse of a driving pulse (second driving pulse, one example of the second unit conveying command), the sub-scanning stepping motor rotates by a predetermined angle (twenty-first angle). This rotation of the sub-scanning stepping motor causes the driving roller to also rotate by a predetermined angle (twenty-second angle). Then, this rotation of the driving roller causes the sheet of the target measurement object to be conveyed (moved) by a predetermined amount along the sub-scanning direction. More specifically, in the example shown in FIG. 2, the sub-scanning direction moving unit 2 includes three sets of first to third sheet conveying roller units 20-1 to 20-3. These first to third sheet conveying roller units 20-1 to 20-3 are disposed along the sub-scanning direction in order from the upstream side to the downstream side. The first to third sheet conveying roller units 20-1 to 20-3 include first to third driving rollers 21-1 to 21-3 and first to third driven rollers 22-1 to 22-3, respectively. Note that the first to third driving rollers 21-1 to 21-3 are rotated by unillustrated first to third stepping motors which rotate in synchronization with each other. In the forward feed, the sheet of the target measurement object fed from the paper feed unit 1 is sandwiched between the pair of the first driving roller 21-1 and the first driven roller 22-1 and conveyed from the first sheet conveying roller unit 20-1 to the second sheet conveying roller unit 20-2 by rotationally driving the first driving roller 21-1 normally (e.g., clockwise) with the driving unit. The sheet of the target measurement object conveyed to the second sheet conveying roller unit 20-2 is similarly conveyed from the second sheet conveying roller unit 20-2 to the third sheet conveying roller unit 20-3 by the second sheet conveying roller unit 20-2. Then, the sheet of the target measurement object conveyed to the third sheet conveying roller unit 20-3 is similarly conveyed from the third sheet conveying roller unit 20-3 to the downstream side by the third sheet conveying roller unit 20-3. Accordingly, in the backward feed, contrary to the above forward feed, the sheet of the target measurement object is conveyed from the downstream side to the upstream side by rotationally driving these first to third driving rollers 21-1 to 21-3 reversely (counterclockwise in the above example) with the driving units.

Note that, in the following description, the main scanning direction (first direction) is an X direction (horizontal direction), a coordinate axis set along this X direction is an X axis, the sub-scanning direction (second direction) is a Y direction (vertical direction), a coordinate axis set along this Y direction is a Y axis, and these are used as appropriate. As will be described later, these X and Y axes correspond to X and Y axes in a world coordinate system XY by setting a coordinate origin (world coordinate origin) $PO_0$ at a predetermined position preset in an image imaged by the imaging unit 5, for example, at an upper left vertex (upper left corner) of the image in a planar view (see FIG. 8).

The colorimetric unit 3 is a device which is connected to the control processing unit 6 and measures the colors of the target measurement object according to the control of the control processing unit 6. The colorimetric unit 3 is, for example, a colorimetric sensor or the like for acquiring predetermined optical information on the target measurement object to obtain the colors of the target measurement object. This colorimetric unit 3 is, for example, a spectroscopic colorimeter which includes a spectroscopic optical element, a photoelectric conversion element and the like for measuring a reflectance (or transmittance) of each wavelength and measures the color of an object based on the reflectance (or transmittance) of each wavelength. Alternatively, for example, the colorimetric unit 3 is a tristimulus colorimeter which includes an optical filter, a photoelectric conversion element and the like for measuring tristimulus values of RGB and measures the color of an object based on color differences between the tristimulus values. The colorimetric unit 3 is subjected to white calibration by measuring a so-called white calibration plate (standard white plate) which is indicated by a broken line in FIG. 1 and can reflect a wavelength in a measurement range with a high reflectance (e.g., about 90% to about 99%).

The main scanning direction moving unit 4 is a moving mechanism which is connected to the control processing unit 6 and moves the colorimetric unit 3 in the main scanning direction (first direction) by each predetermined amount by a predetermined unit conveying command (first unit conveying command) according to the control of the control processing unit 6. The main scanning direction moving unit 4 is configured by including, for example, a guide member for guiding the colorimetric unit 3, a feed mechanism such as, for example, a rack pinion (rack and pinion) or a feed screw for moving the colorimetric unit 3 as being guided by the guide member, and a feed mechanism driving unit such as, for example, a stepping motor (main scanning stepping motor) for driving the feed mechanism. For example, as shown in FIG. 3, the main scanning direction moving unit 4 includes a rack 31 which extends along the main scanning direction and is gear-cut into a flat rod and a pinion (not illustrated) which is provided in the colorimetric unit 3 and rotationally driven by, for example, a main scanning stepping motor, and the pinion and the rack 31 mesh with each other. In the main scanning direction moving unit 4 with such a configuration, by inputting one pulse of a driving pulse (first driving pulse, one example of the first unit conveying command), the main scanning stepping motor rotates by a predetermined angle (eleventh angle). This rotation of the main scanning stepping motor causes the pinion to also rotate by a predetermined angle (twelfth angle). Then, this rotation of the pinion causes the colorimetric unit 3 to be moved by a predetermined amount along the rack 31 in the main scanning direction.

The imaging unit 5 is a device which is connected to the control processing unit 6 and images an optical image of an object according to the control of the control processing unit 6. The imaging unit 5 is configured by including, for example, a line sensor (linear image sensor) in which a plurality of photoelectric conversion elements are arrayed along one direction, and the like. As shown in FIG. 3, the one direction, which is an array direction of the plurality of the photoelectric conversion elements, is matched with the main scanning direction (X direction), and the imaging unit 5 is disposed so as to extend along the main scanning direction (X direction).

As shown in FIG. 2, this imaging unit 5 is disposed between the first sheet conveying roller unit 20-1 and the second sheet conveying roller unit 20-2, and the colorimetric unit 3 and the main scanning direction moving unit 4 are disposed so that the colorimetric unit 3 moves along the main scanning direction between the second sheet conveying roller unit 20-2 and the third sheet conveying roller unit 20-3. The imaging unit 5 generates an image (image data) of the sheet of the target measurement object by imaging the sheet of the target measurement object by each one line along the main scanning direction (X direction) as the sub-scanning direction moving unit 2 conveys the sheet of the target measurement object in the sub-scanning direction (Y direction). The sub-scanning direction moving unit 2 conveys the sheet of the target measurement object in the sub-scanning direction (Y direction) so that a relative position Y between the sheet of the target measurement object and the colorimetric unit 3 in the sub-scanning direction can be changed. Moreover, the main scanning direction moving unit 4 moves the colorimetric unit 3 itself in the main scanning direction (X direction) so that a relative position X between the sheet of the target measurement object and the colorimetric unit 3 in the main scanning direction can be changed. Thus, the colorimetric unit 3 can move to an arbitrary position (X, Y) on the sheet of the target measurement object and measure the color of that position (X, Y).

As described above, in the present embodiment, the colorimetric unit 3 can move only in the main scanning direction against the sheet of the target measurement object by the main scanning direction moving unit 4. Meanwhile, the movement of the sheet of the target measurement object along the sub-scanning direction is executed by the sub-scanning direction moving unit (paper conveying unit) 2. Therefore, in the present embodiment, the main scanning direction moving unit 4 and the sub-scanning direction moving unit 2 correspond to one example of a moving unit which relatively moves the position of the colorimetric unit against the sheet of the target measurement object.

The input unit 7 is an instrument which is connected to the control processing unit 6 and inputs in the colorimetric device CM various data required to perform colorimetry. For example, the input unit 7 inputs various commands such as a command for instructing to colorimetrically measure the target measurement object, and an identifier in the target object measurement object. The input unit 7 is, for example, a plurality of input switches, a keyboard, a mouse and the like to which predetermined functions are assigned. The output unit 8 is an instrument which is connected to the control processing unit 6 and outputs the commands and data input from the input unit 7 and the colors of the target measurement object measured by the colorimetric device CM according to the control of the control processing unit 6. The output unit 8 is, for example, a display device such as a CRT display, an LCD or an organic EL display, and a printing device such as a printer.

Note that a touch panel may be configured from the input unit 7 and the output unit 8. When this touch panel is configured, the input unit 7 is a position input device of a resistive film type, an electrostatic capacitive type or the like which detects and inputs operating positions, and the output unit 8 is a display device. In this touch panel, the position input device is provided on a display surface of the display device, and candidates of one or a plurality of input contents which can be input to the display device are displayed. When a user touches a display position displaying the input content desired to be input, the position thereof is detected by the position input device, and the display content displayed at the detected position is input to the colorimetric device CM as the operation input content of the user. With this touch panel, since the user can easily understand the input operations intuitively, the colorimetric device CM that is easy for the user to handle is provided.

The IF unit 9 is a circuit which is connected to the control processing unit 6 and inputs and outputs data to and from an external instrument according to the control of the control processing unit 6. For example, the IF unit 9 is an RS-232C interface circuit of serial communication, an interface circuit which uses Bluetooth (registered trademark) standard, an interface circuit which performs infrared communication such as infrared data association (IrDA) standard, an interface circuit which uses universal serial bus (USB) standard, or the like.

The memory unit 10 is a circuit which is connected to the control processing unit 6 and stores various predetermined programs and various predetermined data according to the control of the control processing unit 6. The various predetermined programs include, for example, control processing programs such as a colorimetric program for measuring the color of the target measurement object, a chart region detection program for obtaining a chart region of a color chart CT when the target measurement object is the color chart CT, and a position measurement program for obtaining each position of each patch in a color chart CT when the target measurement object is the color chart CT. The various predetermined data include data required for executing each program, and the like. The memory unit 10 includes, for example, a read only memory (ROM) which is a nonvolatile memory element, an electrically erasable programmable read only memory (EEPROM) which is a rewritable nonvolatile memory element, and the like. Further, the memory unit 10 includes a random access memory (RAM) serving as a so-called working memory of the control processing unit 6, which stores data and the like generated during the execution of the predetermined programs, and the like.

The control processing unit 6 is a circuit for controlling each unit of the colorimetric device CM according to the function of each unit to obtain the colors of the target measurement object. The control processing unit 6 is configured by including, for example, a central processing unit (CPU) and peripheral circuits thereof. By executing the control processing programs, the control processing unit 6 is functionally configured with a control unit 61, an image acquisition processing unit 62, a chart region candidate extraction processing unit 63, an evaluation index arithmetic processing unit 64, a chart region determination processing unit 65, a patch position processing unit 66, a color measurement processing unit 67 and a determination criterion setting unit 68.

The control unit 61 controls each unit of the colorimetric device CM according to the function of each unit.

The image acquisition processing unit 62 acquires an image of the sheet of the target measurement object, for example, a color chart CT or the like by the imaging unit 5. More specifically, in the present embodiment, since the imaging unit 5 is configured by including a line sensor and the like, the image acquisition processing unit 62 acquires an image of the sheet of the target measurement object by, for example, imaging the sheet of the target measurement object such as a color chart CT with the imaging unit 5 as the sheet is conveyed by the sub-scanning direction moving unit (paper conveying unit) 2.

Based on the image of the color chart CT acquired by the image acquisition processing unit 62, the chart region candidate extraction processing unit 63 extracts a chart region candidate which is a candidate for a chart region in which a plurality of patches exist. More specifically, for example, the chart region candidate extraction processing unit 63 binarizes the image of the color chart CT acquired by the image acquisition processing unit 62 and extracts, from the image (binary image) obtained by this binarization, a region equal to or greater than a preset minimum patch area as a chart region candidate.

For the chart region candidate extracted by the chart region candidate extraction processing unit 63, the evaluation index arithmetic processing unit 64 obtains an evaluation value indicating a degree of the chart region candidate being the chart region based on the image of the chart region candidate. More specifically, in the present embodiment, the evaluation index arithmetic processing unit 64 includes, for example, a line image analysis line processing unit 641 and a pixel ratio arithmetic processing unit 642 as shown in FIG. 5. The line image analysis line processing unit 641 obtains a line image of the chart region candidate based on the image of the chart region candidate and obtains a straight line included in the obtained line image as an analysis line. The pixel ratio arithmetic processing unit 642 obtains a ratio of a second pixel number to a first pixel number and obtains an evaluation value based on the obtained ratio. The first pixel number is a total number of pixels constituting the image of the color chart CT acquired by the image acquisition processing unit 62. The second pixel number is a total number of pixels in an overlapping portion in a predetermined range from the analysis line obtained by the line image analysis line processing unit 641 in the line image obtained by the line image analysis line processing unit 641. The predetermined range is appropriately preset. Note that the pixel ratio arithmetic processing unit 642 may obtain, as the second pixel number, a total number of pixels in an overlapping portion between the line image and the analysis line obtained by the line image analysis line processing unit 641. Moreover, the pixel ratio arithmetic processing unit 642 may set, as the evaluation value, the ratio itself of the second pixel number to the first pixel number. Alternatively, the pixel ratio arithmetic processing unit 642 may set, as the evaluation value, the result of performing at least one of calculations of addition, subtraction, multiplication and division on the ratio of the second pixel number to the first pixel number with a predetermined constant (parameter).

Based on the evaluation value obtained by the evaluation index arithmetic processing unit 64 corresponding to the chart region candidate extracted by the chart region candidate extraction processing unit 63, the chart region determination processing unit 65 determines whether or not the chart region candidate extracted by the chart region candidate extraction processing unit 63 is a chart region. More specifically, in the present embodiment, by using a determination criterion, the chart region determination processing unit 65 determines whether or not the chart region candidate extracted by the chart region candidate extraction processing unit 63 is a chart region based on the evaluation value obtained by the evaluation index arithmetic processing unit 64 corresponding to the chart region candidate extracted by the chart region candidate extraction processing unit 63.

For the chart region candidate determined as a chart region by the chart region determination processing unit 65, the patch position processing unit 66 obtains positions of a plurality of patches based on the image of the color chart acquired by the image acquisition processing unit 62. More specifically, in the present embodiment, for example, the patch position processing unit 66 uses an edge filter used for detecting an edge extending in one direction in the image to binarize the image of the color chart CT in the chart region, thereby generating binary horizontal edge image data and binary vertical edge image data for the horizontal direction (main scanning direction, X direction) and the vertical direction (sub-scanning direction, Y direction), respectively. The patch position processing unit 66 further performs Hough transform on each of these generated binary horizontal edge image data and binary vertical edge image data, thereby detecting a horizontal edge line and a vertical edge line for the horizontal direction and the vertical direction, respectively. Then, the patch position processing unit 66 obtains each intersection of each of intermediate lines thereof as each position of each patch.

The color measurement processing unit 67 relatively moves, by the sub-scanning direction moving unit 2 and the main scanning direction moving unit 4, the position of the colorimetric unit 3 against the color chart CT to each position of the plurality of patches obtained by the patch position processing unit 66 and measures the color of each of the plurality of patches by the colorimetric unit 3.

The determination criterion setting unit 68 sets the determination criterion used by the chart region determination processing unit 65. More specifically, in the present embodiment, the determination criterion setting unit 68 is, for example, a determination criterion setting unit 68a which sets the determination criterion based on the evaluation value obtained by the evaluation index arithmetic processing unit 64.

Figure 7:
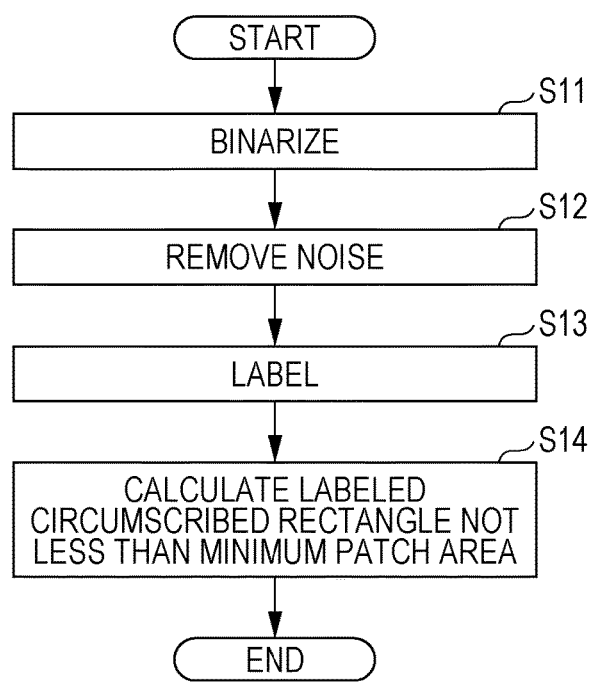
FIG. 7 is a flowchart showing operations of a chart region candidate extraction processing unit in the colorimetric device of the embodiment.
Figure 9:
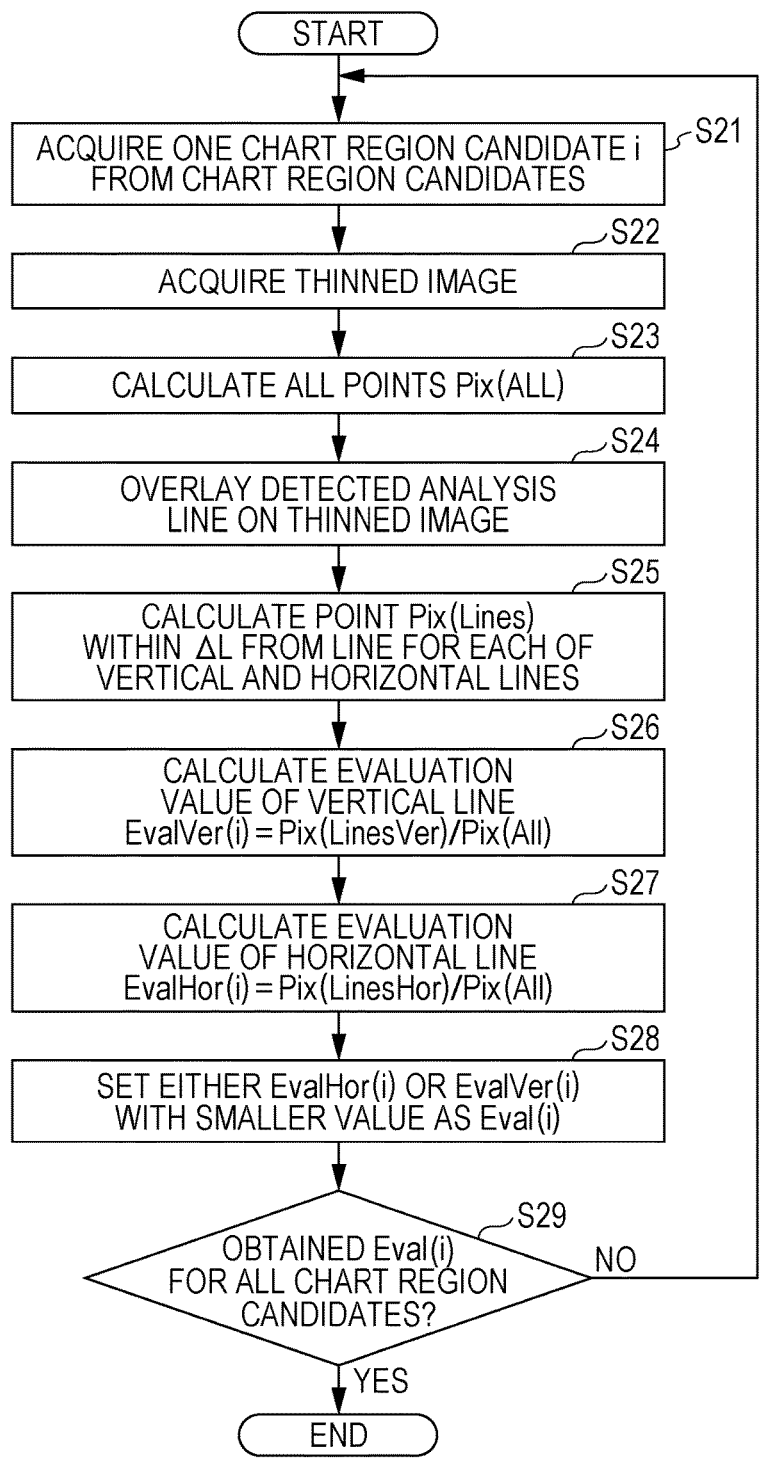
FIG. 9 is a flowchart showing operations of the evaluation index arithmetic processing unit in the colorimetric device of the embodiment.
Figure 10A:
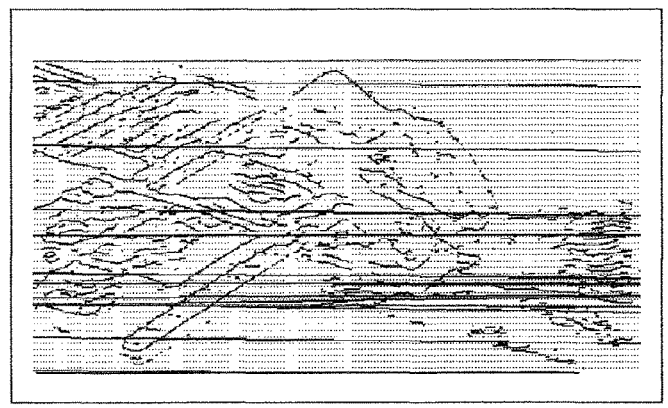
FIG. 10 is a view for explaining the operations of the evaluation index arithmetic processing unit in the colorimetric device of the embodiment.
Figure 10B:
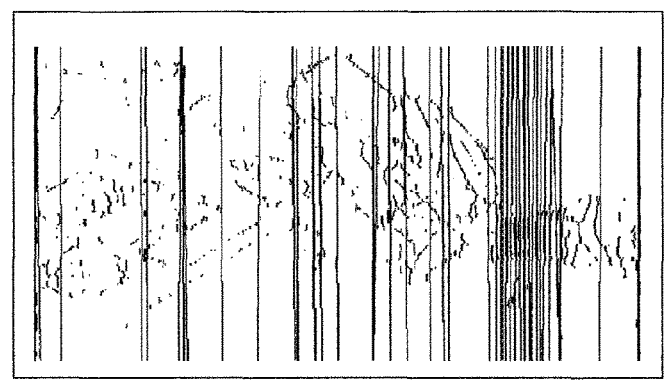
Figure 11:
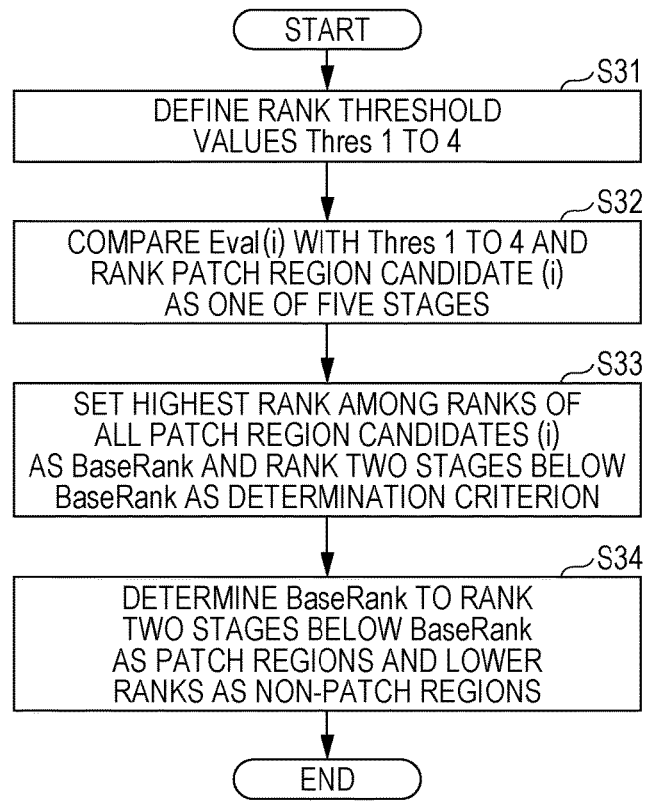
FIG. 11 is a flowchart showing operations of a chart region determination processing unit in the colorimetric device of the embodiment.
Figure 12:
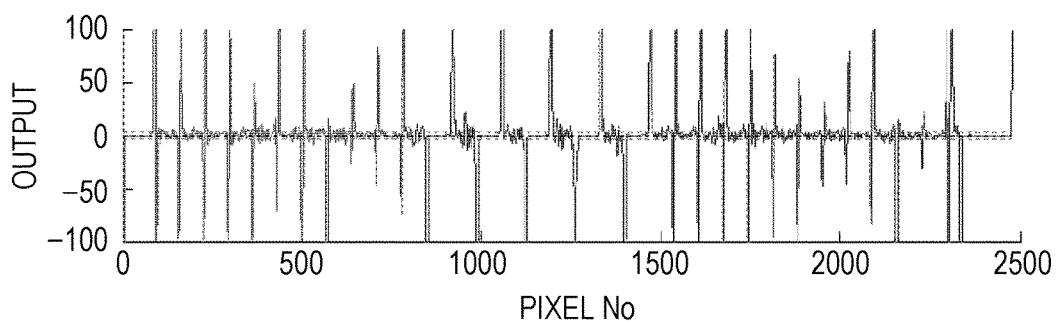
FIG. 12 is a view showing one example of processing result obtained by processing an image at a certain position in a Y direction in a color chart shown in FIG. 18 with a difference filter of a difference interval N point along a horizontal direction.
Figure 13:
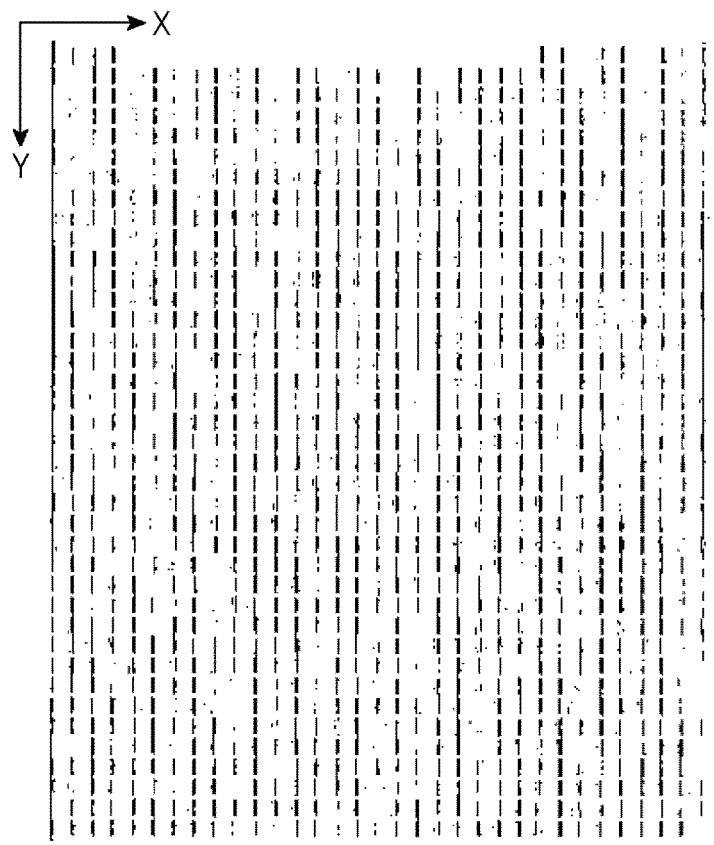
FIG. 13 is a view showing a binary vertical edge image of the color chart as one example.
Figure 14:
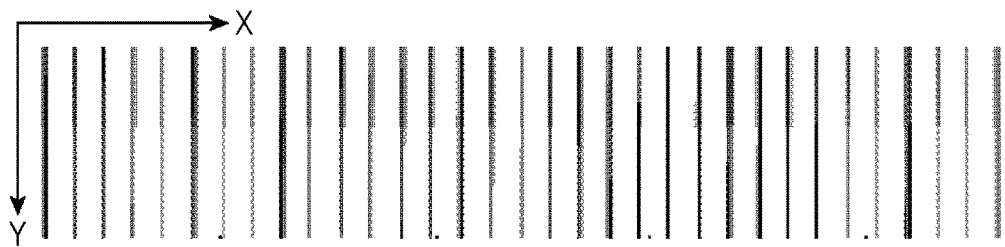
FIG. 14 is a view showing part of vertical edge lines of the color chart as one example.
Figure 15:
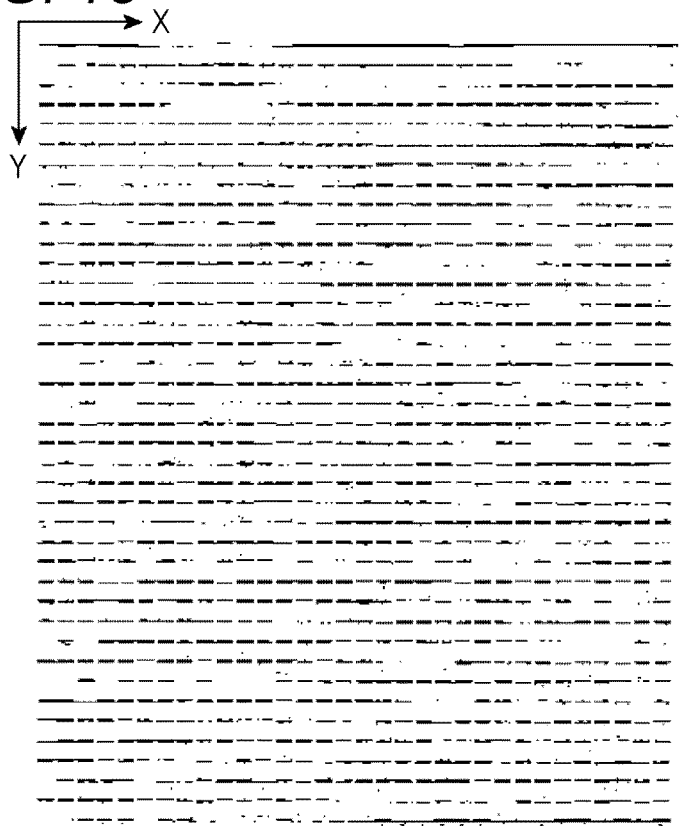
FIG. 15 is a view showing a binary horizontal edge image of the color chart as one example.
Figure 16:
FIG. 16 is a view showing part of horizontal edge lines of the color chart as one example.
Figure 17:
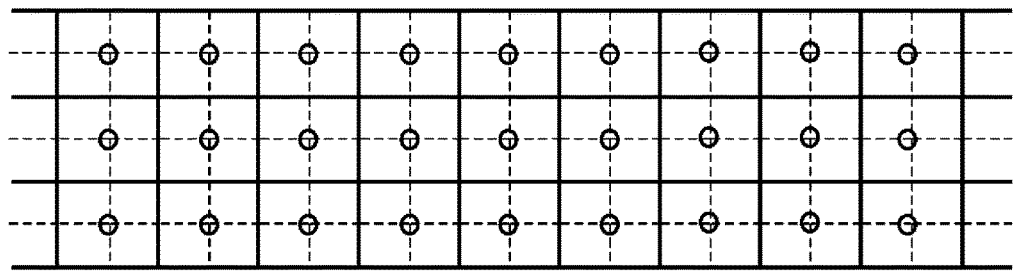
FIG. 17 is a view showing part of positions of patches obtained from the vertical edge lines and horizontal edge lines of the color chart as one example.
Figure 18:
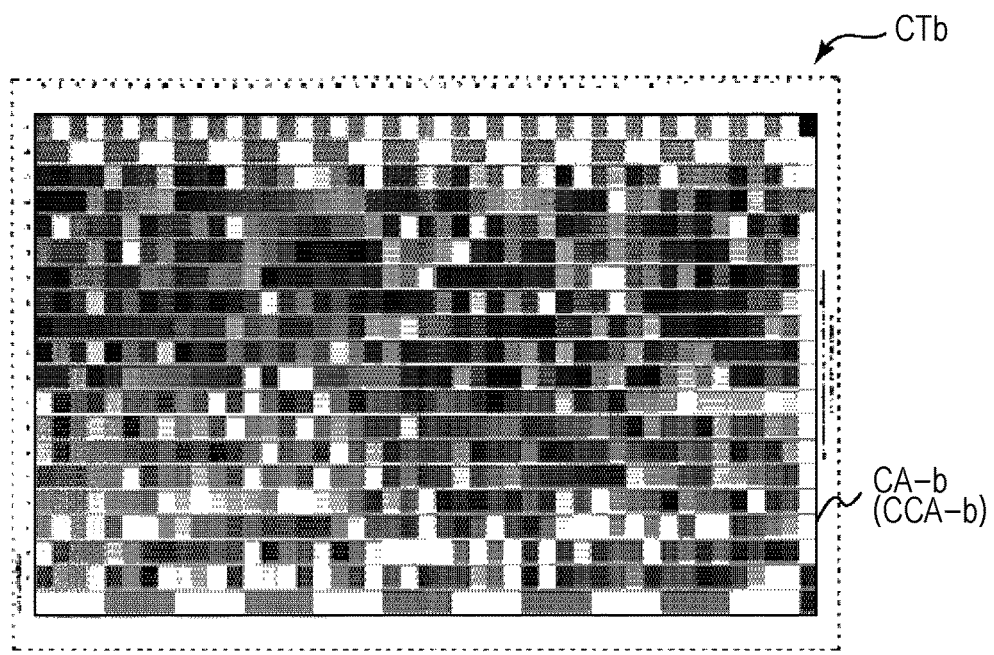
FIG. 18 is a view showing another example of the color chart.

Next, the operations of the colorimetric device in the present embodiment will be described. FIG. 7 is a flowchart showing the operations of the chart region candidate extraction processing unit in the colorimetric device of the embodiment. FIG. 8 is a view for explaining the operations of the chart region candidate extraction processing unit in the colorimetric device of the embodiment. FIG. 9 is a flowchart showing the operations of the evaluation index arithmetic processing unit in the colorimetric device of the embodiment. FIG. 10 is a view for explaining the operations of the evaluation index arithmetic processing unit in the colorimetric device of the embodiment. FIG. 11 is a flowchart showing the operations of the chart region determination processing unit in the colorimetric device of the embodiment. FIG. 12 is a view showing one example of processing result obtained by processing an image at a certain position in a Y direction in a color chart shown in FIG. 18 by a difference filter of a difference interval of N point along the horizontal direction. FIG. 13 is a view showing a binary vertical edge image of the color chart as one example. FIG. 14 is a view showing part of vertical edge lines of the color chart as one example. FIG. 15 is a view showing a binary horizontal edge image of the color chart as one example. FIG. 16 is a view showing part of horizontal edge lines of the color chart as one example. FIG. 17 is a view showing part of positions of patches obtained from the vertical edge lines and horizontal edge lines of the color chart as one example. In FIG. 17, solid lines indicate vertical edge lines or horizontal edge lines, broken lines indicate intermediate lines between the vertical edge lines or intermediate lines between the horizontal edge lines, and circles indicate positions of measured patches (measured patch position). FIG. 18 is a view showing another example of the color chart.

Figure 6:
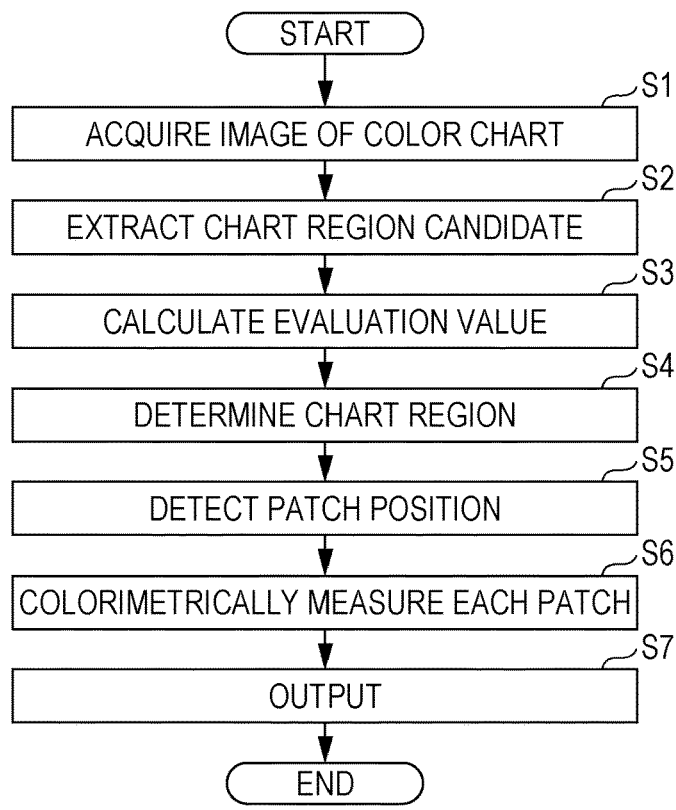
FIG. 6 is a flowchart showing schematic operations of the colorimetric device in the embodiment.

The colorimetric device CM in the present embodiment operates as follows to colorimetrically measure each patch of the color chart CT. When the color chart CT is set in the paper feed unit 1 and the start of colorimetry on the color chart CT is instructed from the input unit 7, the colorimetric device CM first acquires the entire image of the color chart CT, for example, with the forward feed by the image acquisition processing unit 62 as shown in FIG. 6 (S1, image acquisition processing step). More specifically, as the sub-scanning direction moving unit 2 conveys the color chart CT with the forward feed in the sub-scanning direction (Y direction) from one end to the other end of the paper of the color chart CT, the image acquisition processing unit 62 of the control processing unit 6 acquires the entire image of the color chart CT by imaging the color chart CT line by line along the main scanning direction (X direction) with the imaging unit 5 in synchronization with this conveyance in the sub-scanning direction.

For example, an image IMa of a color chart CTa shown in FIG. 8A is thereby acquired. This color chart CTa shown in FIG. 8A includes not only chart regions CA-1 to CA-6 on the left side part and the lower part in a planar view, but also normal image regions IMA-1 and IMA-2 of normal images capturing articles in the upper part in a planar view, and a normal image region IMA-3 of a normal image capturing a person in a slightly right central part in a planar view.

Next, based on the image of the color chart CT acquired by the image acquisition processing unit 62, the colorimetric device CM extracts a chart region candidate which is a candidate for a chart region in which a plurality of patches exist (S2, a chart region candidate extraction processing step).

More specifically, the chart region candidate extraction processing unit 63 of the control processing unit 6 operates as follows. In FIG. 7, the chart region candidate extraction processing unit 63 binarizes the image of the color chart CT acquired by the image acquisition processing unit 62 (S11). More specifically, the chart region candidate extraction processing unit 63 compares a pixel value of the brightness of each pixel in the image of the color chart CT with a preset threshold value (first threshold value) th1. As a result of this comparison, for example, the pixel value of the pixel is set to 0 when the pixel value of the brightness is equal to or greater than the first threshold value th1, and the pixel value of the pixel is set to 1 when the pixel value of the brightness is less than the first threshold value th1. The pixel value of each pixel is thereby binarized. The first threshold value th1 is tested for various images and determined as appropriate.

Next, the chart region candidate extraction processing unit 63 removes noise (S12). Binary image data is thereby generated. For example, when there are only pixels with a pixel value of 0 around a pixel with a pixel value of 1 (e.g., when the pixel value of all the pixels adjacent to the pixel is 0), the pixel with a pixel value of 1 is determined as noise, and the pixel value of the pixel is replaced with 0.

Next, the chart region candidate extraction processing unit 63 integrates a plurality of consecutive pixels with a pixel value of 1 (a plurality of pixels with a pixel value of 1 and adjacent to each other) into one, thereby generating a region with a pixel value of 1 (significant image region). Then, the chart region candidate extraction processing unit 63 allocates a label (e.g., a serial number or the like) h of the significant image region, which serves as an identifier (ID) for distinguishing the regions from each other to identify and specify the region, to the generated significant image region (S13).

Next, the chart region candidate extraction processing unit 63 determines whether or not the area of the significant image region obtained by the process S13 is equal to or greater than a preset minimum patch area, extracts the significant image region equal to or greater than the minimum patch area as a chart region candidate, calculates a rectangle (circumscribed rectangle) circumscribing the extracted chart region candidate, and stores the calculation result in the memory unit 10 (S14). The minimum patch area is a value preset as the minimum area of the patch, and therefore, the chart region candidate is configured by including not only a plurality of patches but also one patch. As for the calculation of the circumscribed rectangle, for example, a coordinate value of each of four vertexes in the circumscribed rectangle of the chart region candidate is obtained, and the obtained coordinate values are stored in the memory unit 10 in association with a label i of the chart region candidate. Note that, for example, an XY orthogonal coordinate system (world coordinate system XY), in which the upper left vertex of the image is the coordinate origin (world coordinate origin) PO$_0$, is set in the image. This world coordinate system XY is set so as to include an X axis along the X direction (horizontal direction) of the main scanning direction and include a Y axis along the Y direction (vertical direction) of the sub-scanning direction orthogonal thereto.

When these processes S11 to S14 are performed on the image IMa of the color chart CTa shown in FIG. 8A, nine chart region candidates CCA-1 to CCA-9 are obtained as shown in FIG. 8B. Accordingly, coordinate values (Xn, Yn) of four vertices of each of these chart region candidates CCA-1 to CCA-9 are obtained and stored in the memory unit 10 in association with the label i (i=an integer of 1 to 9).

Herein, the chart region candidate CCA thus obtained can be considered to be detected as the chart region CA. For example, in a color chart CTb shown in FIG. 18, a chart region candidate CCA-b having a circumscribed rectangle shown in FIG. 18 is detected by performing each of the processes S11 to S14, and this chart region candidate CCA-b matches a chart region CA-b. However, for example, in the color chart CTa shown in FIG. 8 including not only the chart regions CA-1 to CA-6 but also the normal image regions IMA-1 to IMA-3, by performing each of the processes S11 to S14, regions corresponding to the normal image regions IMA-1 to IMA-3 are also extracted as the chart region candidates CCA-2 to CCA-4 as shown in FIG. 8B, and the chart region candidate CCA does not match the chart region CA. For this reason, the colorimetric device CM in the present embodiment further performs each of the following processes S3 and S4.

Returning to FIG. 6, for the chart region candidate CCA extracted by the chart region candidate extraction processing unit 63, the colorimetric device CM next obtains the evaluation value indicating the degree of the chart region candidates CCA being the chart regions CA based on the image of the chart region candidate CCA (S3, evaluation index arithmetic processing step).

More specifically, the evaluation index arithmetic processing unit 64 of the control processing unit 6 operates as follows. In FIG. 9, the evaluation index arithmetic processing unit 64 acquires a chart region candidate CCA-i of a label i among the chart region candidate CCA extracted by the chart region candidate extraction processing unit 63 from the memory unit 10 (S21). Note that the label i is initialized to 1 when the program is activated.

Next, for the chart region candidate CCA-i of the label i, the line image analysis line processing unit 641 of the evaluation index arithmetic processing unit 64 obtains a line image (an image of a line drawing) of the chart region candidate CCA-i based on the image of the chart region candidate CCA-i and obtains a straight line included in the obtained line image as an analysis line (S22). More specifically, the line image analysis line processing unit 641 performs differential processing and thinning processing on the image of the chart region candidate CCA-i by using a known image processing filter and generates a line image of the thinned image. Then, the line image analysis line processing unit 641 performs Hough transform on the line image to obtain the analysis line. The Hough transform is a known digital image processing for detecting a straight line. Alternatively, the analysis line may be obtained by a least squares method, instead of the Hough transform. In the present embodiment, since the patch is a rectangle, the line image analysis line processing unit 641 obtains an analysis line (horizontal analysis line) extending along the horizontal direction (main scanning direction, X direction) and an analysis line (vertical analysis line) extending along the vertical direction (sub-scanning direction, Y direction).

Next, the pixel ratio arithmetic processing unit 642 of the evaluation index arithmetic processing unit 64 obtains the first pixel number Pix (ALL) which is the total number of pixels constituting the image IM of the color chart CT acquired by the image acquisition processing unit 62, more preferably the total number of pixels constituting the chart region candidate CCA-i (S23).

Next, the pixel ratio arithmetic processing unit 642 overlays the line image and the analysis lines (in this example, the horizontal analysis line and the vertical analysis line) generated by the line image analysis line processing unit 641 (S24).

Next, the pixel ratio arithmetic processing unit 642 obtains, as the second pixel number Pix (Lines), the total number of pixels in the overlapping portion in a predetermined range ΔL from the analysis line in the line image (S25). In the present embodiment, the pixel ratio arithmetic processing unit 642 obtains, as a second horizontal pixel number Pix (LinesHor), the total number of pixels in an overlapping portion in a predetermined range ΔL from the horizontal analysis line in the line image and obtains, as a second vertical pixel number Pix (LinesVer), the total number of pixels in an overlapping portion in a predetermined range ΔL from the vertical analysis line in the line image. Note that the pixel ratio arithmetic processing unit 642 may obtain, as the second pixel number, the total number of pixels in the overlapping portion between the line image and the analysis line.

Next, the pixel ratio arithmetic processing unit 642 obtains a ratio of the second pixel number Pix (Lines) to the first pixel number Pix (ALL) and obtains an evaluation value Eva (i) based on the obtained ratio (S26 to S28). More specifically, in the present embodiment, the pixel ratio arithmetic processing unit 642 obtains a ratio of the second vertical pixel number Pix (LinesVer) to the first pixel number Pix (ALL) and sets the obtained ratio as a vertical evaluation value EvaVer(i) (EvaVer (i)=Pix (LinesVer)/Pix (ALL)) (S26). Next, the pixel ratio arithmetic processing unit 642 obtains a ratio of the second horizontal pixel number Pix (LineHor) to the first pixel number Pix (ALL) and sets the obtained ratio as a horizontal evaluation value EvaHor (i) (EvaHor (i)=Pix (LinesHor)/Pix (ALL)) (S27). Then, to generate a more reliable evaluation value, the pixel ratio arithmetic processing unit 642 compares the vertical evaluation value EvaVer (i) with the horizontal evaluation value EvaHor (i), sets the smaller value as the evaluation value Eva (i) and stores the obtained evaluation value Eva (i) in the memory unit 10 (S28). Note that the evaluation value Eva (i) may be a simple average value of these vertical evaluation value EvaVer (i) and horizontal evaluation value EvaHor (i) or a weighted average value weighted with a weight according to the aspect ratio of the color chart CT.

When the patch is a rectangle, the line image and the analysis line of the chart region CA substantially represent the outline of the patch so that the line image and the analysis line match with a relatively high probability. However, the line image and the analysis line in the normal image region IMA usually do not match very much. For example, when a line image and horizontal analysis lines of the normal image region IMA-3 capturing a person in the color chart CTa shown in FIG. 8A are overlaid, the result shown in FIG. 10A is obtained. When the line image and vertical analysis lines are overlaid, the result shown in FIG. 10B is obtained. As can be seen from these FIGS. 10A and 10B, the line image and the analysis lines in the normal image region IMA-3 do not match very much, and there are not many overlapping pixels. Therefore, the evaluation value Eva (i) obtained as described above is a better evaluation value indicating the degree of the chart region candidate CCA being the chart region CA.

Note that, although the vertical analysis line and the horizontal analysis line are obtained and the vertical evaluation value EvaVer (i) and the horizontal evaluation value EvaHor (i) are obtained in the above description, either one of the vertical or the horizontal may be obtained to reduce the information processing amount. That is, only the vertical analysis line and the vertical evaluation value EvaVer (i) may be obtained, and the vertical evaluation value EvaVer (i) may be set as the evaluation value Eva (i). Alternatively, only the horizontal analysis line and the horizontal evaluation value EvaHor (i) may be obtained, and the horizontal evaluation value EvaHor (i) may be set as the evaluation value Eva (i).

Next, the evaluation index arithmetic processing unit 64 determines whether or not the evaluation value Eva (i) has been obtained for all the chart region candidates CCA-i (S29). As a result of this determination, when there is a chart region candidate CCA-i for which the evaluation value Eva (i) has not been calculated (No), the label i is incremented by 1 and the process returns to the process S21. On the other hand, as a result of the determination, when the calculation of the evaluation value Eva (i) has been completed for all the chart region candidates CCA-i (Yes), the evaluation index arithmetic processing step S3 ends.

Returning to FIG. 6, by using the determination criterion, the colorimetric device CM next determines whether or not the chart region candidate CCA extracted by the chart region candidate extraction processing unit 63 is the chart region CA based on the evaluation value obtained by the evaluation index arithmetic processing unit 64 corresponding to the chart region candidate CCA extracted by the chart region candidate extraction processing unit 63 (S4, chart region determination processing step).

More specifically, the chart region determination processing unit 65 of the control processing unit 6 operates as follows. In FIG. 11, the chart region determination processing unit 65 first defines first to fourth rank threshold values Thres 1 to Thres 4 to classify the evaluation value Eva (i) into five stages (S31). For example, the chart region determination processing unit 65 divides the maximum evaluation value Eva (i) into five equal parts and sets each of boundary values, which are used for the division into these five equal parts, as the first to fourth rank threshold values Thres 1 to Thres 4.

Next, the chart region determination processing unit 65 compares each evaluation value Eva (i) of each chart region candidate CCA-i with each of these first to fourth rank threshold values Thres 1 to Thres 4 and ranks the chart region candidate CCA-i as one of the five stages (S32).

Next, as a result of the ranking in the process S32, the chart region determination processing unit 65 sets the highest rank as a base rank BaseRank and sets a rank two stages below this base rank BaseRank as a determination criterion (S33). Since at least one chart region CA always exists in the color chart CT, the highest rank is set as the base rank BaseRank, and the chart region candidate CCA-i with a rank between the BaseRank and the rank two stages below this base rank BaseRank is regarded as the chart region CA.

Next, the chart region determination processing unit 65 determines the chart region candidate CCA-i having a rank equal to or greater than the determination criterion as the chart region CA, determines the chart region candidate CCA-i having a rank lower than the determination criterion as a non-chart region (S34) and ends the chart region determination processing step.

For example, when the highest rank is set to 5 by the process S32, the determination criterion is set to 3 by the process S33, and the chart region candidate CCA-i having either the ranks 3, 4 or 5 is determined as the chart region CA by the process S34. Moreover, for example, when the highest rank is set to 3 by the process S32, the determination criterion is set to 1 by the process S33, and the chart region candidate CCA-i having either the ranks 1, 2 or 3, that is, all the chart region candidates CCA-i are determined as the chart regions CA by the process S34.

Returning to FIG. 6, for the chart region candidate CCA determined as the chart region CA by the chart region determination processing unit 65, the colorimetric device CM next obtains positions of the plurality of the patches based on the image IM of the color chart CT acquired by the image acquisition processing unit 62 and stores each obtained position of each patch in the memory unit 10 (S5, patch position processing step). For example, based on the entire image of the color chart CT acquired by the image acquisition processing unit 62, the patch position processing unit 66 detects a vertical edge along the vertical direction (Y direction) by using a predetermined edge filter for vertical edge detection and detects a horizontal edge along the horizontal direction (X direction) by using a predetermined edge filter for horizontal edge detection. FIG. 12 shows one example of processing result obtained by processing an image at a certain position in the Y direction in the color chart CTb shown in FIG. 18 by a difference filter of a difference interval N point along the X direction, as one example. Subsequently, the patch position processing unit 66 obtains an absolute value of the vertical edge after the edge filter processing, compares the obtained absolute value with a preset threshold value to perform binarization and generates the image data of the binary vertical edge. As one example, when the processing result after the edge filter processing is binarized for the image of the color chart CTb shown in FIG. 18, for example, image data of a binary vertical edge image shown in FIG. 13 is generated. Similarly, the patch position processing unit 66 obtains an absolute value of the horizontal edge after the edge filter processing, compares the obtained absolute value with a preset threshold value to perform binarization and generates the image data of the binary horizontal edge. As one example, when the processing result after the edge filter processing is binarized for the image of the color chart CTb shown in FIG. 18, for example, image data of a binary horizontal edge image shown in FIG. 15 is generated. Subsequently, the patch position processing unit 66 performs Hough transform on both the image data of the binary vertical edge and the image data of the binary horizontal edge of the color chart CT and detects both the vertical edge line and the horizontal edge line. For example, when Hough transform is performed on the image data of the binary vertical edges of the color chart CTb shown in FIG. 13, for example, the vertical edge lines shown in FIG. 14 are detected. In addition, when Hough transform is performed on the image data of the binary horizontal edges of the color chart CTb shown in FIG. 15, for example, the horizontal edge lines shown in FIG. 16 are detected. Then, the patch position processing unit 66 obtains a vertical intermediate line, which is an intermediate line between vertical edge lines adjacent to each other, for each of the plurality of vertical edge lines and similarly obtains a horizontal intermediate line, which is an intermediate line between horizontal edge lines adjacent to each other, for each of the plurality of the horizontal edge lines. Then, the patch position processing unit 66 obtains, as a position (X, Y) of each patch, each intersection of the obtained plurality of the vertical intermediate lines and the obtained plurality of the horizontal intermediate lines. For example, when the vertical intermediate lines are obtained based on the vertical edge lines obtained for the color chart CTb shown in FIG. 18, vertical intermediate lines indicated by broken lines in FIG. 17 are obtained. When the horizontal intermediate lines are obtained based on the horizontal edge lines, horizontal intermediate lines indicated by broken lines in FIG. 17 are obtained. Then, each intersection thereof is obtained as each position (X, Y) of each patch as indicated by a circle in FIG. 17. Each position (X, Y) of each patch is stored in the memory unit 10.

Then, to colorimetrically measure the plurality of the patches at each position of the plurality of the patches thus obtained, the colorimetric device CM operates as follows: by the color measurement processing unit 67, the sub-scanning direction moving unit 2 and the main scanning direction moving unit 4 relatively move the position of the colorimetric unit 3 against the color chart CT to each position of the plurality of the patches obtained by the patch position processing unit 66, the colorimetric unit 3 measures the color of each of the plurality of patches, and the measurement results are stored in the memory unit 10 (S6, colorimetric processing step).

Then, when the color measurement processing unit 67 colorimetrically measures the last patch, the control unit 61 of the control processing unit 6 outputs each color of each of these colorimetrically measured patches to the output unit 8, and the colorimetric device CM ends the process (S7). Note that the control unit 61 of the control processing unit 6 may output each color of each measured patch to the IF unit 9 as necessary.

As described above, the colorimetric device CM and the colorimetric method implemented therein in the present embodiment extract the chart region candidate CCA, which is a candidate for the chart region CA, from the image IM of the color chart CT by the chart region candidate extraction processing unit 63 (chart region candidate extraction processing step S2), obtain the evaluation value Eva of this chart region candidate CCA by the evaluation index arithmetic processing unit 64 (evaluation index arithmetic processing step S3), determine whether or not the chart region candidate CCA is the chart region CA based on this obtained evaluation value Eva by the chart region determination processing unit 65 (chart region determination processing step S4), obtain each position of the plurality of the patches for the chart region candidate CCA determined as the chart region CA as a result of this determination, and colorimetrically measure each patch at each obtained position of the plurality of the patches by the colorimetric unit 3. Therefore, the colorimetric device CM and the colorimetric method implemented therein in the present embodiment can appropriately determine the chart region CA and automatically perform colorimetry at an appropriate position. Particularly, the colorimetric device CM and the colorimetric method implemented therein in the present embodiment can appropriately determine the chart regions CA from not only the color chart CTb including only the chart region CA-b shown in FIG. 18, but also the color chart CTa including the normal image regions IMA-1 to IMA-3 in addition to the chart regions CA-1 to CA-6 shown in FIG. 8A. Moreover, the colorimetric device CM and the colorimetric method implemented therein in the present embodiment can remove a patch with contamination and the like upon colorimetry by appropriately setting the determination criterion and can reduce erroneous detection of the region with contamination and the like in the color chart CT as the position of the patch.

When the patch is a rectangle, it is considered that the line image and the analysis line overlap in many pixels in the chart region CA and there are a few pixels where the line image and the analysis line overlap in the normal image region IMA. Thus, the colorimetric device CM and the colorimetric method implemented therein in the present embodiment obtain the evaluation value Eva based on the ratio of the second pixel number Pix (Lines), which is the pixel number in the overlapping portion in the line image with the analysis lines or the neighborhood of the analysis lines, to the first pixel number (ALL), which is the pixel number of the entire image of the color chart CT, more preferably, the pixel number of the entire image of the chart region candidate CCA-i, and thus can generate a more appropriate evaluation value Eva.

Since the colorimetric device CM and the colorimetric method implemented therein in the present embodiment include the determination criterion setting unit 68a, a more appropriate determination criterion can be set. By using this determination criterion, whether or not the chart region candidate CCA is the chart region CA can be determined by a simple process.

Since the determination criterion is obtained by the determination criterion setting unit 68a based on the evaluation value in the colorimetric device CM and the colorimetric method implemented therein in the present embodiment, the colorimetric device CM and the colorimetric method implemented therein in the present embodiment can automatically set the determination criterion by the determination criterion setting unit 68a.

Note that, although the determination criterion setting unit 68a for setting the determination criterion based on the evaluation value Eva obtained by the evaluation index arithmetic processing unit 64 is used for the determination criterion setting unit 68 in the above embodiment, instead of this determination criterion setting unit 68a, a determination criterion setting unit 68b for receiving the determination criterion from the outside may be used.

FIG. 19 is a view for explaining another determination criterion setting unit in the colorimetric device of the embodiment. More specifically, after the execution of the above evaluation index arithmetic processing step S3 and before the execution of the chart region determination processing step S4, the determination criterion setting unit 68b displays on the output unit 8 the image IM of the color chart CT acquired by the image acquisition processing unit 62, a determination criterion setting bar 681 and a determination criterion setting slider 682. For example, as shown in FIG. 19, the determination criterion setting unit 68b displays an image IMa of a color chart CTa in the substantially central display region of the output unit 8 and displays the determination criterion setting bar 681 and the determination criterion setting slider 682 in a display region below the display region of the output unit 8 displaying the image IMa of the color chart CTa. The determination criterion setting bar 681 is a part for indicating high and low (large and small) of the determination criterion. In an example shown in FIG. 19, the determination criterion setting bar 681 is a part displayed as a bar which extends in the X direction in a planar view. The determination criterion is associated with the determination criterion setting bar 681 so as to be increased (enlarged) from the left end side to the right end side in order. The determination criterion setting slider 682 is a part which is moved on the determination criterion setting bar 681 by an input from the input unit 7, for example a mouse or the like, and is for inputting a desired determination criterion to the colorimetric device CM. A user (operator) moves the determination criterion setting slider 682 on the determination criterion setting bar 681 through the input unit 7. When the determination criterion setting slider 682 is moved, the determination criterion setting unit 68b acquires a position of the determination criterion setting slider 682 on the determination criterion setting bar 681, receives the determination criterion at a value according to the acquired position and sets the determination criteria. Then, the chart region determination processing unit 65 executes the chart region determination processing step S4 with this received determination criterion. The determination criterion setting unit 68b overlays a predetermined determination mark Mkc on the chart region candidate CCA determined as the chart region CA as a result of the execution of the chart region determination processing step S4 and displays the determination mark Mkc on the output unit 8. Thus, the user can appropriately set the determination criterion by moving the determination criterion setting slider 682 on the determination criterion setting bar 681 as referring to the determination mark Mkc displayed on the output unit 8.

Figure 19A:
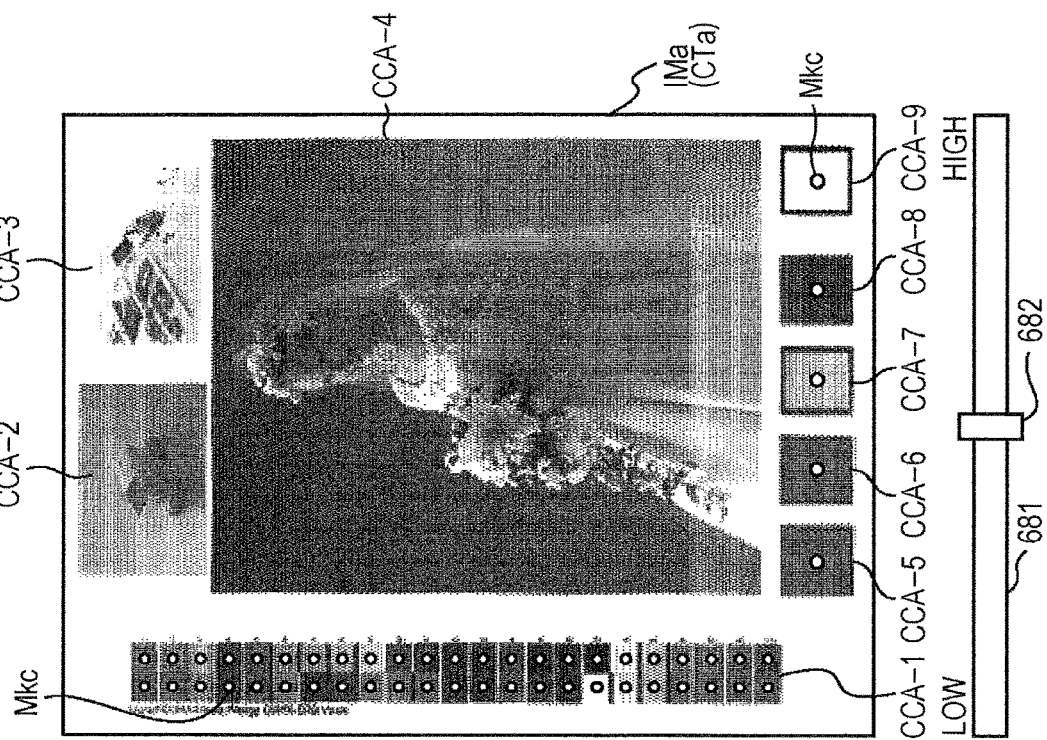
FIG. 19 is a view for explaining another determination criterion setting unit in the colorimetric device of the embodiment.
Figure 19B:
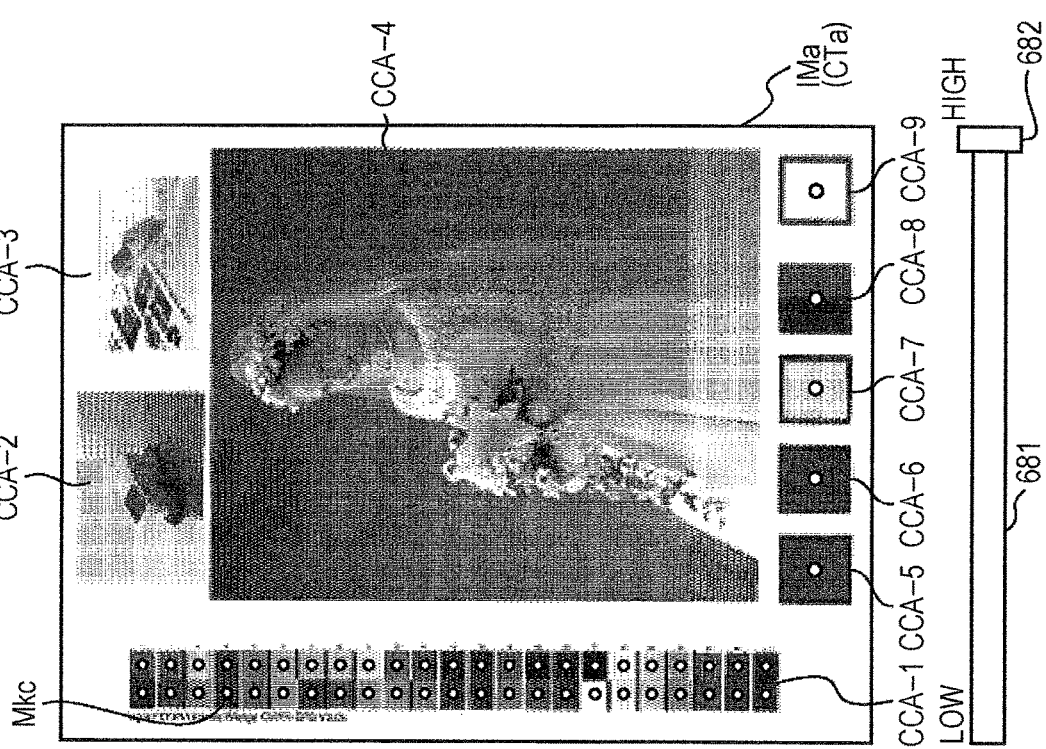

For example, in FIG. 19A, the determination criterion setting slider 682 is positioned at a right end position of the determination criterion setting bar 681 by the user through the input unit 7. As a result, the highest determination criterion is set (e.g., 5 in a five stage setting). According to this highest determination criterion, the determination marks Mkc (o) are overlaid and displayed only on the chart region candidate CCA-1 positioned at the left side, and only this chart region candidate CCA-1 is being determined as the chart region CA-1. Note that, in the example shown in FIG. 19, the determination mark Mkc is overlaid and displayed on each patch in the chart region candidate CCA-1 determined as the chart region CA-1. On the other hand, in FIG. 19B, the determination criterion setting slider 682 is positioned at the substantially central position of the determination criterion setting bar 681 by the user through the input unit 7. As a result, an approximately intermediate determination criterion is set (e.g., 3 in a five stage setting). According to this approximately intermediate determination criterion, the determination marks Mkc (o) are overlaid and displayed not only on the chart region candidate CCA-1 positioned at the left side but also on the chart region candidates CCA-5 to CCA-9 positioned at the lower part, and these chart region candidates CCA-1 and CCA-5 to CCA-9 are being determined as the chart regions CA-1 and CA-2 to CA-6.

In the colorimetric device CM configured by including this determination criterion setting unit 68b, since the determination criterion setting unit 68b receives the determination criterion from the outside, an appropriate determination criterion can be set by the user.

In the above embodiment, as indicated by a broken line in FIG. 4, the colorimetric device CM is configured by further including an order allocation processing unit 69 for allocating an order of being measured by the color measurement processing unit 67 to the chart region candidate CCA determined as the chart region CA by the chart region determination processing unit 65. In this case, the color measurement processing unit 67 may be configured so as to, according to the order allocated by the order allocation processing unit 69, relatively move the position of the colorimetric unit 3 against the color chart CT to each position of the plurality of the patches obtained by the patch position processing unit 66 by the sub-scanning direction moving unit 2 and the main scanning direction moving unit 4 and measure the color of each of this plurality of the patches by the colorimetric unit 3.

Then, preferably, the order allocation processing unit 69 allocates the order to the chart region candidate CCA determined as the chart region CA by the chart region determination processing unit 65 in the order that a local reference position, which is positioned at one end of the sub-scanning direction Y being one end of the main scanning direction X in the image of the chart region candidate CCA, is closer to a world reference position, which is positioned at one end of the sub-scanning direction Y being one end of the main scanning direction X in the image IM of the color chart CT, in the sub-scanning direction Y and in the order that the local reference position is closer to the world reference position in the main scanning direction X when the local reference positions are at the same positions in the sub-scanning direction Y. The world reference position is, for example, a world coordinate origin $PO_0$. In this case, the local reference position is set to the upper left vertex (upper left corner) of the chart region candidate CCA of the circumscribed rectangle in a planar view, corresponding to the world reference position. Note that a local coordinate system xy having the local reference position at the local coordinate origin $po_0$ may be set in the chart region candidate CCA (see FIG. 8A).

For example, in the example shown in FIG. 8, the chart region candidates CCA-1 and CCA-5 to CCA-9 are determined as the chart regions CA-1 and CA-2 to CA-6 by the chart region determination processing step executed by the above chart region determination processing unit 65, and the order allocation processing unit 69 allocates order 1 to the chart region candidate CCA-1 (chart region CA-1), allocates order 2 to the chart region candidate CCA-5 (chart region CA-2), allocates order 3 to the chart region candidate CCA-6 (chart region CA-3), allocates order 4 to the chart region candidate CCA-7 (chart region CA-4), allocates order 5 to the chart region candidate CCA-8 (chart region CA-5) and allocates order 6 to the chart region candidate CCA-9 (chart region CA-6). Then, the color measurement processing unit 67 measures the color of each patch according to this order.

Note that an order evaluation function $ODeval=10/Y_0+1/X_0$ for evaluating the order may be generated by using a coordinate value $(X_0, Y_0)$ of the local reference position (local coordinate origin $po_0$) and the order may be allocated according to a value of this order evaluation function ODeval. Alternatively, the order may be allocated to each patch, instead of each chart region candidate CCA (chart region CA).

This colorimetric device CM can colorimetrically measure each patch of each chart region CA in appropriate order when extracted the plurality of the chart regions CA. Moreover, this colorimetric device can efficiently colorimetrically measure each patch of each chart region CA when the sub-scanning direction moving unit 2 and the main scanning direction moving unit 4 relatively move the position of the colorimetric unit 3 against the color chart CT from the world reference position (world coordinate origin $PO_0$ in the above example).

Although the colorimetric device CM includes the imaging unit 5 configured by including a line sensor in which the plurality of the photoelectric conversion elements are arrayed along one direction, and the like in the above embodiment, instead of the imaging unit 5, the colorimetric device CM may include an imaging unit configured by including an area sensor (two-dimensional image sensor) in which a plurality of photoelectric conversion elements are two-dimensionally arrayed in two directions linearly independent from each other (e.g., two directions orthogonal to each other), and the like. This imaging unit configured by including an area sensor and the like can image the entire image of the color chart CT without conveying the color chart CT as described above.

In the present embodiment described above, the movement of the position of the colorimetric unit 3 against the sheet of the target measurement object is achieved by the movement of the colorimetric unit 3 by the main scanning direction moving unit 4 along the main scanning direction and achieved by the movement of the sheet of the target measurement object by the sub-scanning direction moving unit 2 along the sub-scanning direction. However, the invention is not limited to this. A moving unit for relatively moving the position of the colorimetric unit 3 against the sheet of the target measurement object may be, for example, a moving mechanism for moving the colorimetric unit 3 in two directions, the main scanning direction and the sub-scanning direction, against the sheet of the target measurement object placed on a stage in a resting state. Alternatively, the moving unit may be, for example, an XY stage on which the sheet of the target measurement object is placed and which moves in two directions, the main scanning direction and the sub-scanning direction, against the fixed colorimetric unit 3. Moreover, for example, the moving unit may be configured so as to move the colorimetric unit 3 in one direction of the main scanning direction and the sub-scanning direction and move the stage in the other direction. For the moving unit with this configuration, the imaging unit configured by including the above area sensor and the like is suitable.

The present specification has disclosed various aspects of the technologies as described above, and the main technologies among those are summarized below.

A colorimetric device according to one aspect includes a colorimetric unit which measures color, an imaging unit which acquires an image, a moving unit which relatively moves a position of the colorimetric unit against a sheet of a target measurement object, an image acquisition processing unit which acquires, by the imaging unit, an image of a color chart plurally including a patch which is a region of a predetermined color, a chart region candidate extraction processing unit which extracts a chart region candidate, which is a candidate for a chart region in which the plurality of the patches exist, based on the image of the color chart acquired by the image acquisition processing unit, an evaluation index arithmetic processing unit which obtains, for the chart region candidate extracted by the chart region candidate extraction processing unit, an evaluation value indicating a degree of the chart region candidate being the chart region based on an image of the chart region candidate, a chart region determination processing unit which determines whether or not the chart region candidate extracted by the chart region candidate extraction processing unit is the chart region based on the evaluation value obtained by the evaluation index arithmetic processing unit corresponding to the chart region candidate extracted by the chart region candidate extraction processing unit, a patch position processing unit which obtains, for the chart region candidate determined as the chart region by the chart region determination processing unit, positions of the plurality of the patches based on the image of the color chart acquired by the image acquisition processing unit, and a color measurement processing unit which relatively moves, by the moving unit, the position of the colorimetric unit against the color chart to each of the positions of the plurality of the patches obtained by the patch position processing unit and measures, by the colorimetric unit, a color of each of the plurality of the patches.

This colorimetric device extracts the chart region candidate, which is the candidate for the chart region, from the image of the color chart by the chart region candidate extraction processing unit, obtains the evaluation value of this chart region candidate by the evaluation index arithmetic processing unit, determines whether or not the chart region candidate is the chart region based on this obtained evaluation value by the chart region determination processing unit, obtains each position of the plurality of the patches for the chart region candidate determined as the chart region as a result of the determination and colorimetrically measures each of the patches at each obtained position of the plurality of the patches by the colorimetric unit. Therefore, the above colorimetric device can appropriately determine the chart region and automatically perform colorimetry at an appropriate position.

In other aspect, in the above colorimetric device, the evaluation index arithmetic processing unit includes a line image analysis line processing unit which obtains a line image of the chart region candidate based on the image of the chart region candidate and obtains a straight line included in the obtained line image as an analysis line, and a pixel ratio arithmetic processing unit which obtains a ratio of a second pixel number which is a total number of pixels in an overlapping portion between the line image and the analysis line obtained by the line image analysis line processing unit, or a second pixel number which is a total number of pixels in an overlapping portion in a predetermined range from the analysis line obtained by the line image analysis line processing unit in the line image obtained by the line image analysis line processing unit, to a first pixel number which is a total number of pixels constituting the image of the color chart acquired by the image acquisition processing unit, and obtains the evaluation value based on the obtained ratio.

When the patch is a rectangle, it is considered that the line image and the analysis line overlap in many pixels in the chart region and there are a few pixels where the line image and the analysis line overlap in the normal image region. Therefore, the above colorimetric device obtains the evaluation value based on the ratio of the second pixel number which is the pixel number in the overlapping portion in the analysis line or the neighborhood of the analysis line in the line image, to the first pixel number which is the pixel number of the entire image of the color chart and thus can generate a more appropriate evaluation value.

In other aspect, in the above colorimetric device, the chart region determination processing unit determines, by using a determination criterion, whether or not the chart region candidate extracted by the chart region candidate extraction processing unit is the chart region based on the evaluation value obtained by the evaluation index arithmetic processing unit corresponding to the chart region candidate extracted by the chart region candidate extraction processing unit, and further includes a determination criterion setting unit which sets the determination criterion.

Since this colorimetric device includes a determination criterion setting unit, a more appropriate criterion can be set. By using this determination criterion, whether or not the chart region candidate is the chart region can be determined by a simple process.

In other aspect, in the above colorimetric device, the determination criterion setting unit sets the determination criterion based on the evaluation value obtained by the evaluation index arithmetic processing unit.

In this colorimetric device, since the determination criterion is obtained by the determination criterion setting unit based on the evaluation value, the colorimetric device can automatically set the determination criterion by the determination criterion setting unit.

In other aspect, in the above colorimetric device, the determination criterion setting unit receives the determination criterion from the outside.

In this colorimetric device, since the determination criterion setting unit receives the determination criterion from the outside, an appropriate determination criterion can be set by the user.

In other aspect, the above colorimetric device further includes an order allocation processing unit for allocating an order of being measured by the color measurement processing unit to the chart region candidate determined as the chart region by the chart region determination processing unit, and, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

This colorimetric device can colorimetrically measure each patch of each chart region in an appropriate order when extracted the plurality of the chart regions.

In other aspect, in the above colorimetric device, the moving unit includes amain scanning direction moving unit, which moves the colorimetric unit in amain scanning direction along one direction, and a sub-scanning direction moving unit which moves a sheet of a target measurement object in a sub-scanning direction along another direction orthogonal to the one direction, and the order allocation processing unit allocates the order to the chart region candidate determined as the chart region by the chart region determination processing unit in the order that a local reference position, which is positioned at one end of the sub-scanning direction being one end of the main scanning direction in the image of the chart region candidate, is closer to a world reference position, which is positioned at one end of the sub-scanning direction being one end of the main scanning direction in the image of the color chart, in the sub-scanning direction and in the order that the local reference position is closer to the world reference position in the main scanning direction when the local reference positions are at the same positions in the sub-scanning direction.

This colorimetric device can efficiently colorimetrically measure each patch of each chart region when the moving unit relatively moves the position of the colorimetric unit against the color chart from the world reference position.

Accordingly, a colorimetric method according to other aspect is a colorimetric method of a colorimetric device which includes a colorimetric unit which measures color, an imaging unit which acquires an image, a moving unit which relatively moves a position of the colorimetric unit against a sheet of a target measurement object, and a control processing unit which controls the colorimetric unit, the imaging unit and the moving unit, and includes an image acquisition processing step of acquiring, by the imaging unit, an image of a color chart plurally including a patch which is a region of a predetermined color, a chart region candidate extraction processing step of extracting a chart region candidate, which is a candidate for a chart region in which the plurality of the patches exist, based on the image of the color chart acquired by the image acquisition processing step, an evaluation index arithmetic processing step of obtaining, for the chart region candidate extracted by the chart region candidate extraction processing step, an evaluation value indicating a degree of the chart region candidate being the chart region based on an image of the chart region candidate, a chart region determination processing step of determining whether or not the chart region candidate extracted by the chart region candidate extraction processing step is the chart region based on the evaluation value obtained by the evaluation index arithmetic processing step corresponding to the chart region candidate extracted by the chart region candidate extraction processing step, a patch position processing step of obtaining, for the chart region candidate determined as the chart region by the chart region determination processing step, positions of the plurality of the patches based on the image of the color chart acquired by the image acquisition processing step, and a color measurement processing step of relatively moving, by the moving unit, the position of the colorimetric unit against the color chart to each of the positions of the plurality of the patches obtained by the patch position processing step and measuring, by the colorimetric unit, a color of each of the plurality of the patches.

This colorimetric method extracts the chart region candidate, which is the candidate for the chart region, from the image of the color chart by the chart region candidate extraction processing step, obtains the evaluation value of this chart region candidate by the evaluation index arithmetic processing step, determines whether or not the chart region candidate is the chart region based on this obtained evaluation value by the chart region determination processing step, obtains each position of the plurality of the patches for the chart region candidate determined as the chart region as a result of the determination and colorimetrically measures each of the patches at each obtained position of the plurality of the patches by the colorimetric unit. Therefore, the above colorimetric method can appropriately determine the chart region and automatically perform colorimetry at an appropriate position.

This application is based on Japanese Patent Application No. 2014-231554 filed on Nov. 14, 2014, and the contents thereof are incorporated in the present application.

To express the present invention, the present invention has been appropriately and fully described above through the embodiments with reference to the drawings. It should be recognized that those skilled in the art can easily change and/or modify the above embodiments. Therefore, unless the changes or modifications performed by those skilled in the art are at a level departing from the scope of the claims set forth in the claims, the changes or modifications are interpreted as being included in the scope of the claims.

INDUSTRIAL APPLICABILITY

According to the present invention, a colorimetric device and colorimetric method can be provided.

The invention claimed is:
1. A colorimetric device, comprising:
a colorimetric unit which measures color;
an imaging unit which acquires an image;
a moving unit which relatively moves a position of the colorimetric unit against a sheet of a target measurement object;
an image acquisition processing unit which acquires, by the imaging unit, an image of a color chart plurally including a patch which is a region of a predetermined color;
a chart region candidate extraction processing unit which extracts a chart region candidate, which is a candidate for a chart region in which the plurality of the patches exist, based on the image of the color chart acquired by the image acquisition processing unit;
an evaluation index arithmetic processing unit which obtains, for the chart region candidate extracted by the chart region candidate extraction processing unit, an evaluation value indicating a degree of the chart region candidate being the chart region based on an image of the chart region candidate;
a chart region determination processing unit which determines whether or not the chart region candidate extracted by the chart region candidate extraction processing unit is the chart region based on the evaluation value obtained by the evaluation index arithmetic processing unit corresponding to the chart region candidate extracted by the chart region candidate extraction processing unit;
a patch position processing unit which obtains, for the chart region candidate determined as the chart region by the chart region determination processing unit, positions of the plurality of the patches based on the image of the color chart acquired by the image acquisition processing unit; and
a color measurement processing unit which relatively moves, by the moving unit, the position of the calorimetric unit against the color chart to each of the positions of the plurality of the patches obtained by the patch position processing unit and measures, by the calorimetric unit, a color of each of the plurality of the patches.

2. The colorimetric device according to claim 1, wherein the evaluation index arithmetic processing unit comprises a line image analysis line processing unit which obtains a line image of the chart region candidate based on the image of the chart region candidate and obtains a straight line included in the obtained line image as an analysis line, and a pixel ratio arithmetic processing unit which obtains a ratio of a second pixel number which is a total number of pixels in an overlapping portion between the line image and the analysis line obtained by the line image analysis line processing unit, or a second pixel number which is a total number of pixels in an overlapping portion in a predetermined range from the analysis line obtained by the line image analysis line processing unit in the line image obtained by the line image analysis line processing unit, to a first pixel number which is a total number of pixels constituting the image of the color chart acquired by the image acquisition processing unit, and obtains the evaluation value based on the obtained ratio.

3. The colorimetric device according to claim 2, wherein the chart region determination processing unit determines, by using a determination criterion, whether or not the chart region candidate extracted by the chart region candidate extraction processing unit is the chart region based on the evaluation value obtained by the evaluation index arithmetic processing unit corresponding to the chart region candidate extracted by the chart region candidate extraction processing unit, and further comprises s a determination criterion setting unit which sets the determination criterion.

4. The colorimetric device according to claim 2, further comprising:
an order allocation processing unit which allocates an order of being measured by the color measurement processing unit to the chart region candidate determined as the chart region by the chart region determination processing unit,
wherein, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

5. The colorimetric device according to claim 1, wherein the chart region determination processing unit determines, by using a determination criterion, whether or not the chart region candidate extracted by the chart region candidate extraction processing unit is the chart region based on the evaluation value obtained by the evaluation index arithmetic processing unit corresponding to the chart region candidate extracted by the chart region candidate extraction processing unit, and further comprises s a determination criterion setting unit which sets the determination criterion.

6. The colorimetric device according to claim 5, wherein the determination criterion setting unit sets the determination criterion based on the evaluation value obtained by the evaluation index arithmetic processing unit.

7. The colorimetric device according to claim 6, further comprising:
an order allocation processing unit which allocates an order of being measured by the color measurement processing unit to the chart region candidate determined as the chart region by the chart region determination processing unit,
wherein, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

8. The colorimetric device according to claim 5, wherein the determination criterion setting unit receives the determination criterion from outside.

9. The colorimetric device according to claim 8, further comprising:
an order allocation processing unit which allocates an order of being measured by the color measurement processing unit to the chart region candidate determined as the chart region by the chart region determination processing unit,
wherein, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

10. The colorimetric device according to claim 5, further comprising:
an order allocation processing unit which allocates an order of being measured by the color measurement processing unit to the chart region candidate determined as the chart region by the chart region determination processing unit,
wherein, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

11. The colorimetric device according to claim 1, further comprising:
an order allocation processing unit which allocates an order of being measured by the color measurement processing unit to the chart region candidate determined as the chart region by the chart region determination processing unit,
wherein, according to the order allocated by the order allocation processing unit, the color measurement processing unit relatively moves the position of the colorimetric unit against the color chart to each position of the plurality of the patches obtained by the patch position processing unit by the moving unit and measures the color of each of the plurality of the patches by the colorimetric unit.

12. The colorimetric device according to claim 11, wherein
the moving unit comprises a main scanning direction moving unit, which moves the colorimetric unit in a main scanning direction along one direction, and a sub-scanning direction moving unit which moves the sheet of the target measurement object in a sub-scanning direction along another direction orthogonal to the one direction, and
the order allocation processing unit allocates the order to the chart region candidate determined as the chart region by the chart region determination processing unit in an order that a local reference position, which is positioned at one end of the sub-scanning direction being one end of the main scanning direction in the image of the chart region candidate, is closer to a world reference position, which is positioned at one end of the sub-scanning direction being one end of the main scanning direction in the image of the color chart, in the sub-scanning direction, and in an order that the local reference position is closer to the world reference position in the main scanning direction when the local reference positions are at same positions in the sub-scanning direction.

13. A colorimetric method of a colorimetric device including a colorimetric unit which measures color, an imaging unit which acquires an image, a moving unit which relatively moves a position of the colorimetric unit against a sheet of a target measurement object, and a control processing unit which controls the colorimetric unit, the imaging unit and the moving unit, the method comprising:
an image acquisition processing step of acquiring, by the imaging unit, an image of a color chart plurally including a patch which is a region of a predetermined color;
a chart region candidate extraction processing step of extracting a chart region candidate, which is a candidate for a chart region in which the plurality of the patches exist, based on the image of the color chart acquired by the image acquisition processing step;
an evaluation index arithmetic processing step of obtaining, for the chart region candidate extracted by the chart region candidate extraction processing step, an evaluation value indicating a degree of the chart region candidate being the chart region based on an image of the chart region candidate;
a chart region determination processing step of determining whether or not the chart region candidate extracted by the chart region candidate extraction processing step is the chart region based on the evaluation value obtained by the evaluation index arithmetic processing step corresponding to the chart region candidate extracted by the chart region candidate extraction processing step;

a patch position processing step of obtaining, for the chart region candidate determined as the chart region by the chart region determination processing step, positions of the plurality of the patches based on the image of the color chart acquired by the image acquisition processing step; and a color measurement processing step of relatively moving, by the moving unit, the position of the colorimetric unit against the color chart to each of the positions of the plurality of the patches obtained by the patch position processing step and measuring, by the colorimetric unit, a color of each of the plurality of the patches.

* * * * *